(12) United States Patent  (10) Patent No.: US 8,275,264 B2
Watanabe  (45) Date of Patent: Sep. 25, 2012

(54) OPTICAL WAVEFORM CONTROLLING APPARATUS

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 699 days.

(21) Appl. No.: 12/076,323

(22) Filed: Mar. 17, 2008

(65) Prior Publication Data

US 2008/0232808 A1  Sep. 25, 2008

(30) Foreign Application Priority Data

Mar. 20, 2007  (JP) ................................ 2007-073117

(51) Int. Cl.
  H04J 14/02  (2006.01)
(52) U.S. Cl. ............................... 398/94; 398/92; 398/95
(58) Field of Classification Search .................. 398/157, 398/160, 197, 34–38, 91–95
  See application file for complete search history.

(56) References Cited

U.S. PATENT DOCUMENTS

| 5,343,320 | A | * | 8/1994 | Anderson | ...................... 398/157 |
| 5,596,667 | A | | 1/1997 | Watanabe | |
| 5,798,853 | A | | 8/1998 | Watanabe | |
| 6,160,942 | A | * | 12/2000 | Watanabe | ..................... 385/122 |
| 6,608,854 | B1 | | 8/2003 | Watanabe | |
| 2001/0053263 | A1 | | 12/2001 | Watanabe | |
| 2004/0066550 | A1 | | 4/2004 | Jay | |
| 2004/0081464 | A1 | * | 4/2004 | Watanabe | ....................... 398/99 |
| 2006/0045445 | A1 | | 3/2006 | Watanabe | |
| 2006/0051100 | A1 | | 3/2006 | Watanabe | |
| 2010/0067099 | A1 | * | 3/2010 | Akasaka et al. | ............... 359/334 |

FOREIGN PATENT DOCUMENTS

| EP | 0 828 174 | 3/1998 |
| EP | 1 093 011 | 4/2001 |
| EP | 1 379 018 | 1/2004 |
| EP | 1 411 659 | 4/2004 |
| JP | 7-98464 | 11/1995 |
| JP | 2000-031901 | 1/2000 |
| JP | 2000-049703 | 2/2000 |
| JP | 2000-323786 | 11/2000 |
| JP | 2001-318397 | 11/2001 |
| JP | 2006-184851 | 7/2006 |
| WO | WO 94-09403 | 4/1994 |
| WO | WO 98-08138 | 2/1998 |

OTHER PUBLICATIONS

Extended European Search Report, mailed Jun. 19, 2008 and issued in corresponding European Patent Application No. 08005122.0-2415.
Japanese Patent Office Notification of Reasons for Refusal mailed Oct. 4, 2011, for corresponding Japanese Patent Application No. 2007-073117.

* cited by examiner

Primary Examiner — Dzung Tran
(74) Attorney, Agent, or Firm — Staas & Halsey LLP

(57) ABSTRACT

According to an aspect of an embodiment, an apparatus for controlling optical waveform, comprises: an input port for inputting a signal light having a modulating frequency and a signal light power; a pump light generator generating pulsed pump light having a frequency higher than the modulating frequency of the signal light and a pulsed pump light power; a nonlinear optical medium for transmitting the signal light from the input port and the pulsed pump light, the nonlinear optical medium having a gain of the signal light based on a nonlinear optical effect; and a power adjustor for adjusting a gain of the signal light saturates in the nonlinear optical medium by a nonlinear optical effect by adjusting at least one of the signal light power or the pulsed pump light power.

17 Claims, 16 Drawing Sheets

OPTICAL WAVEFORM CONTROLLING APPARATUS

CROSS-REFERENCE TO RELATED APPLICATIONS

This application is based upon and claims the benefit of priority from the prior Japanese Patent Application No. 2007-073117, filed on Mar. 20, 2007, the entire contents of which are incorporated herein by reference.

TECHNICAL FIELD

This art relates to an optical waveform controller, an optical signal processor, and an optical repeater that perform waveform control with respect to deteriorated optical signal light.

With the increases in communication capacity, and communication distance, communication devices and communication systems utilizing optical techniques have been come into wide use. In optical communications, the transmission rate (bit rate of data), the total transmission capacity ((transmission rate per channel)×(number of channels)) and the transmittable distance are limited by the waveform distortion and phase distortion of signal light, or the optical signal/noise (S/N) ratio.

The waveform distortion or the phase distortion of signal light is caused by chromatic dispersion (including higher-order dispersion) and/or nonlinear optical effects of optical fibers constituting a transmission line. As countermeasures against the waveform distortion due to the chromatic dispersion, a transmission line in which normal dispersion fibers and anomalous dispersion fibers are alternately arranged, or a dispersion compensation technique employing chromatic dispersion compensator such as dispersion compensation fibers, is employed.

As countermeasures against the loss of signal light in optical fibers, a loss compensation technique using an optical amplifier such as an optical fiber amplifier is used. The optical S/N ratio depends upon a power reduction due to the loss of signal light in optical fibers, amplified spontaneous emission (ASE) noises arising from the above-described optical amplifier for compensating for the loss, and/or noises within a transmitter/receiver.

One of large challenges in the current situation is to realize a long-distance transmission of high-rate signal light such as 40 Gb/s or 160 Gb/s. However, even if a high-precision chromatic dispersion compensator and a high-quality optical amplifier are combined, there occurs a large reduction in the optical S/N ratio due to remaining waveform distortion and phase distortion, or ASE noises arising from the optical amplifier. As a result, the practical transmission distance is limited to a distance on the order of several hundreds of kilometers for 40 Gb/s, and several kilometers for 160 Gb/s.

In order to realize such a long-distance transmission of high-rate signal light, it is indispensable to reshape distorted waveforms or distorted phase and also to implement an optical waveform controller capable of suppressing accumulated ASE noises, phase noises, etc. With this being the situation, an optical waveform controller that controls the waveform of optical signal by utilizing an optical limiter function is disclosed, for example Japanese Laid-open Patent Publication No. 2000-31901 and Japanese Laid-open Patent Publication No. 2000-49703.

In this optical waveform controller, signal light and control light (pump light) are inputted into a nonlinear optical medium such as optical fiber. This optical waveform controller adjusts a relative power between the signal light and the control light, to thereby saturate the gain of the signal light based on a nonlinear optical effect, and suppress intensity noises at the level "1" of the signal light.

SUMMARY

According to an aspect of an embodiment, an apparatus for controlling optical waveform comprises an input port for inputting a signal light having a modulating frequency and a signal light power; a pump light generator generating pulsed pump light having a pulsed pump light power and a frequency higher than the modulating frequency of the signal light; a nonlinear optical medium for transmitting the signal light from the input port and the pulsed pump light from the pump light generator, the nonlinear optical medium having a gain of the signal light based on a nonlinear optical effect; and a power adjustor for adjusting at least one of the signal light power or the pulsed pump light power in order to saturate the gain of the signal light in the nonlinear optical medium.

DETAILED DESCRIPTION OF THE INVENTION

Figure 1:
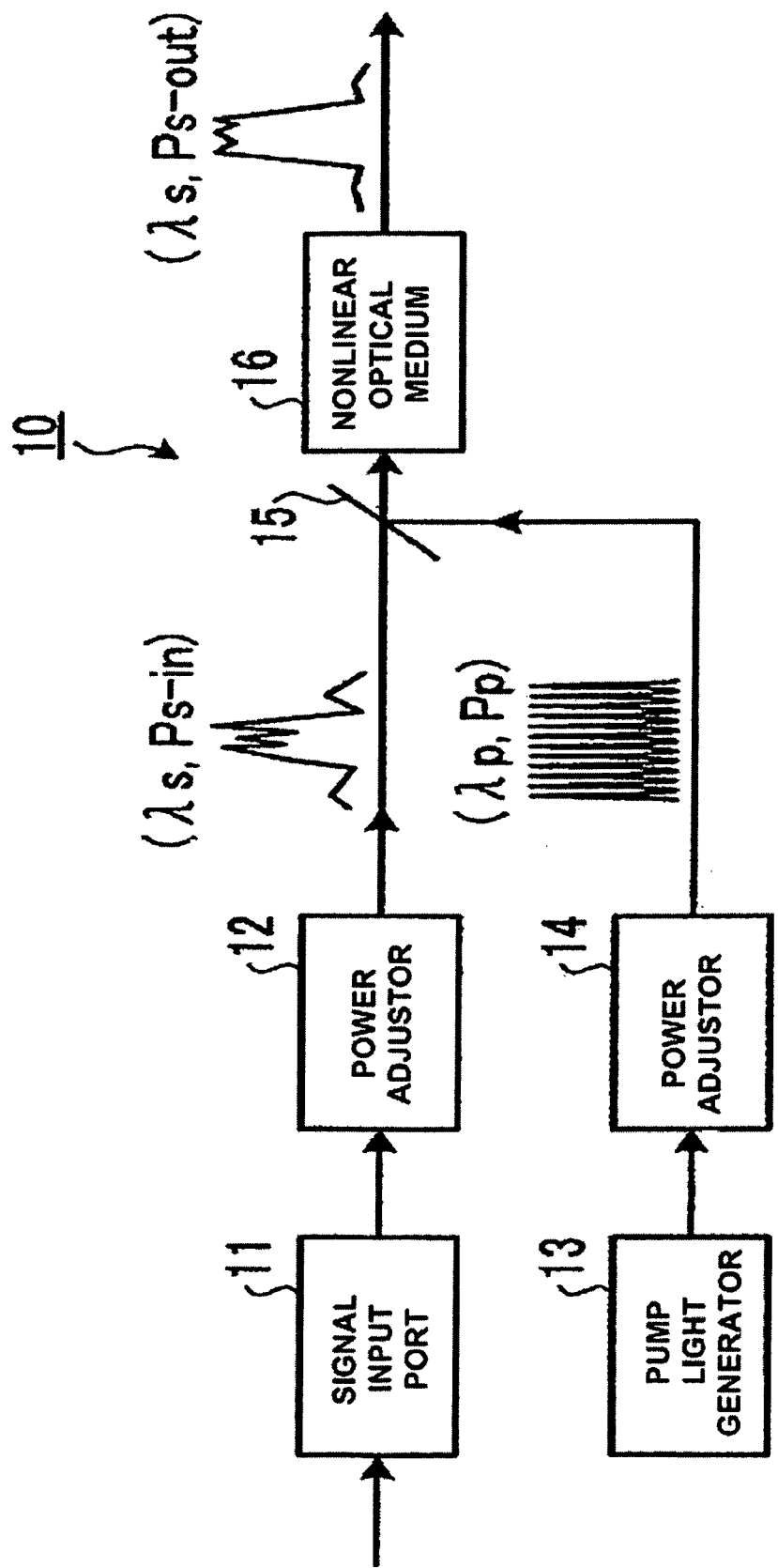
FIG. 1 is a block diagram showing the configuration of an optical waveform controller according to a first embodiment.

The optical waveform controller requires a specified wavelength arrangement or a tuning function with respect to wavelength, which causes an issue of applicable wavelengths of signal light being restricted. As a result, for example, a challenge arises that this optical waveform controller is difficult to be applied to WDM (wavelength division multiplexing) signal light, the WDM signal light being one obtained by subjecting signal light beams having various wavelengths to the wavelength division multiplexing.

The optical waveform controller further involves a challenge that, when using optical pulses as pump light, it requires clock recovery circuit, etc., in order to conform the timing of the signal light to that of the optical pulse. In this case, it is necessary to provide a clock recovery circuit that varies depending on the modulation method for signal light, the bit rate, the pulse width, etc. Accordingly, in order to address a plurality of kinds of signal light beams, a plurality of recovery circuits are needed, which causes an issue of incurring the upsizing, complication, and cost increase of the apparatus.

As countermeasures against this, it is conceivable to employ CW (continuous wave) light as pump light. However, the generation efficiency of nonlinear optical effect depends upon the peak power of pump light. This creates a challenge that, in order to enhance the generation efficiency of the nonlinear optical effect to thereby secure a sufficient gain, there occurs a need for a high-output linear optical amplifier for increasing the overall power of the CW light.

Also, for example, if optical fibers are used as nonlinear optical media, when attempting to increase the power of CW light, inductive stimulated Brillouin scattering occurs within the optical fibers and part of the CW light is reflected. Therefore, even if the power of CW light is increased using a high-output linear optical amplifier, it is difficult to sufficiently increase the power of the CW light within the optical fibers. This creates a challenge that no sufficient gain can be secured when the CW light is used as pump light.

When signal light is WDM signal light, the timing of signal light in each channel is at random in the WDM signal light. Accordingly, in order to perform waveform control with respect to signal light in each channel, it is necessary to branch WDM signal light for each channel and individually perform waveform control. This necessitates a plurality of pump light generating circuits and a plurality of cock recovery circuits, etc., corresponding to respective channels, which causes an issue of incurring the upsizing, complication, and cost increase of the apparatus.

The object of the embodiments are to provide an optical waveform controller, an optical signal processor, and an optical repeater that are capable of transmitting high-rate signal light over a long distance.

Hereinafter, preferred embodiment of an optical waveform controller, an optical signal processor, and an optical repeater according to the embodiment will be specifically described with reference to the appended drawings.

First Embodiment

FIG. 1 is a block diagram showing the configuration of an optical waveform controller according to a first embodiment. The optical waveform controller 10 according to the first embodiment is an optical waveform controller that controls a waveform of signal light transmitted from another communication device. As shown in FIG. 1, the optical waveform controller 10 includes a signal light input port 11, a power adjustor 12, a pump light generator 13, a power adjustor 14, a connecting section 15, and a nonlinear optical medium 16.

To the signal light input port 11, signal light transmitted from another communication device is inputted. The signal light input port 11 outputs the inputted signal light to the power adjustor 12. Here, the wavelength of the signal light that is inputted into the signal light input port 11 is assumed to be $\lambda_s$. The power adjustor 12 adjusts power of the signal light outputted from the signal light input port 11. The power adjustor 12 outputs the signal light with the power adjusted, to the connecting section 15.

The pump light generator 13 generates pump light having a wavelength $\lambda_p$ ($\neq \lambda_p$) different from the wavelength $\lambda_s$ of the signal light that is inputted into the signal light input port 11. The pump light generator 13 outputs the generated pump light to the power adjustor 14. The pump light generator 13 also generates an optical pulse train, as pump light, having a repetition frequency (pulse frequency) higher than a modulation frequency of signal light that is inputted into the signal light input port 11.

The pulse frequency higher than the modulation frequency of signal light is, for example, a pulse frequency roughly 1.5 times higher than the modulation frequency of signal light. The pump light generator 13 is, for example, a pulse laser light source. To the generation of pump light, all conventional pulse generation methods can be applied. The pump light is, for example, an optical pulse train generated by a semiconductor mode-locked laser or a fiber mode-locked laser oscillated by a desired repetition frequency.

Also, the pump light is, for example, an optical pulse train generated by modulating a $LiNbO_3$ intensity modulator or an electronic absorption (EA) modulator by an electric signal having a desired repetition frequency. Furthermore, the pump light is, for example, an optical comb generated by modulating an optical phase modulator by an electric signal with a desired repetition frequency, or an optical pulse train generated by extracting the optical comb only by a desired bandwidth with an optical band-pass filter or the like.

Moreover, the pump light is, for example, super continuum (SC) light generated by inputting optical pulses having a desired repetition frequency into a nonlinear fiber, or an optical pulse train generated by extracting the SC light only by a desired bandwidth with an optical band-pass filter or the like. Also, the pump light is, for example, an optical pulse train constituted of beat light as coherent light detuned by only a desired repetition frequency.

The power adjustor 14 adjusts the power of the pump light outputted from the pump light generator 13. The power adjustor 14 outputs the pump light with the power adjusted, to the connecting section 15. Each of the power adjustor 12 and the power adjustor 14 is, for example, an optical amplifier, an optical attenuator, or a combination of these two.

Here, the power of signal light outputted from the power adjustor 12 is assumed to be $P_{s\text{-}in}$, and the power of pump light outputted from the power adjustor 14 is assumed to be $P_p$. The connecting section 15 connects the signal light outputted from the power adjustor 12 and the pump light outputted from the power adjustor 14. The connecting section 15 outputs the connected signal light and pump light to the nonlinear optical medium 16. The connecting section 15 is, for example, an optical coupler or an optical multiplexer.

The nonlinear optical medium 16 passes therethrough the signal light and the pump light outputted from the connecting section 15. The nonlinear optical medium 16 is, for example, an optical fiber, a semiconductor optical amplifier with a quantum well configuration, or a semiconductor optical amplifier with a quantum dot configuration. Here, the power of the signal light having passed through the nonlinear optical medium 16 is assumed to be $P_{s\text{-}out}$. The wavelength of the signal light having passed through the nonlinear optical medium 16 is $\lambda_s$, which is the same as the wavelength before the signal light passes through the nonlinear optical medium 16.

The nonlinear optical medium 16 may be a medium that effectively generates a second-order nonlinear optical effect such as optical three wave mixing. For example, the nonlinear optical medium 16 may be a $LiNbO_3$ waveguide (periodically poled lithium niobate (PPLN)) or a GaAlAs device, each having a quasi phase matching structure, or a second-order nonlinear optical crystal.

A filter for cutting off the pump light may be provided in a post-stage of the nonlinear optical medium 16. For example, a filter for cutting off light having a wavelength of $\lambda_p$ may be provided in the post-stage of the nonlinear optical medium 16. This allows only signal light to be extracted, out of the signal light and pump light that have passed through the nonlinear optical medium 16. Also, a configuration may be used in which the pulse width of an optical pulse train generated, as pump light, by the pump light generator 13 is appropriately adjusts by compression or the like.

Figure 2:
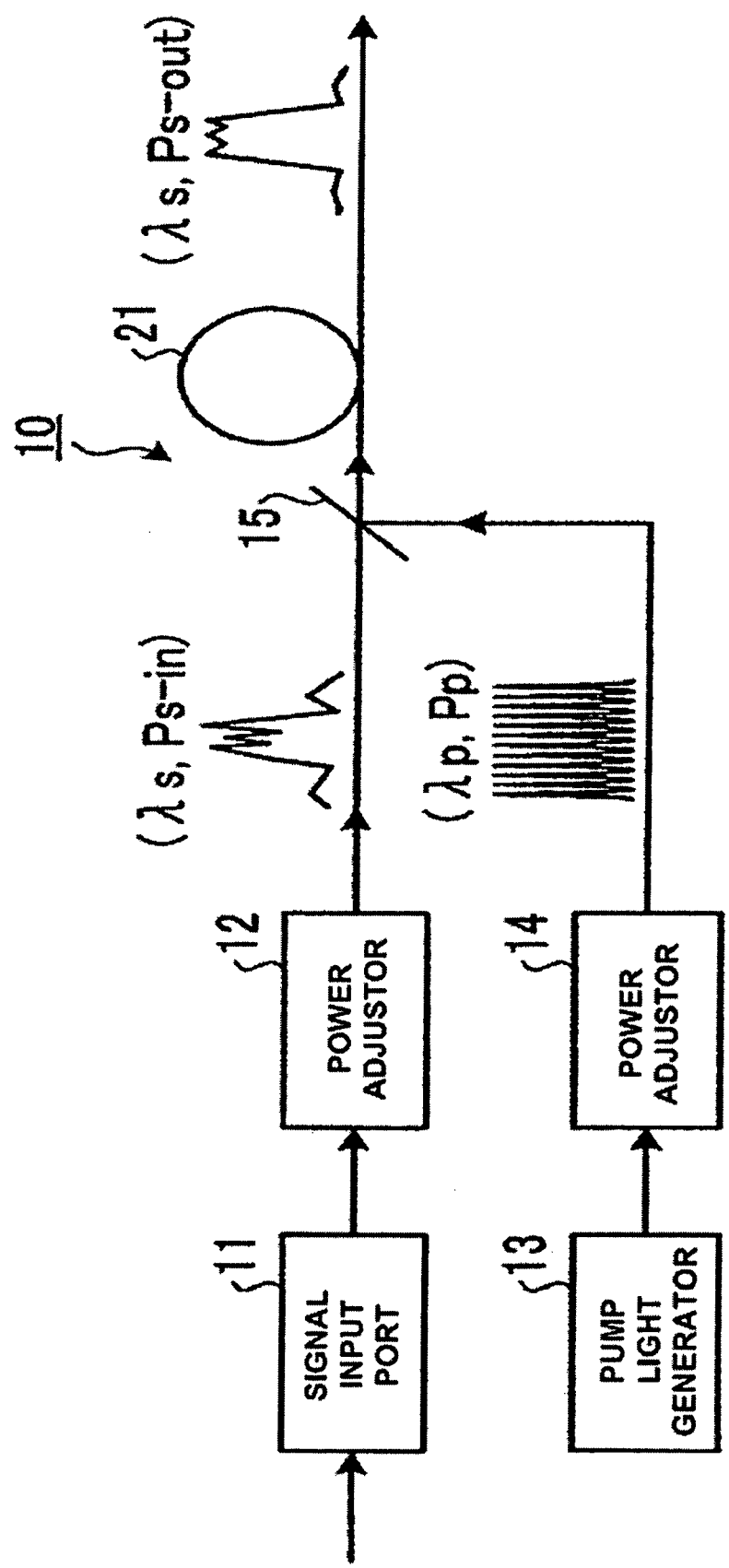
FIG. 2 is a block diagram showing the configuration of the optical waveform controller to which an optical fiber 21 is applied.

FIG. 2 is a block diagram showing the configuration of the optical waveform controller to which an optical fiber is applied. In FIG. 2, the same components as those shown in FIG. 1 are designated by the same symbols, and description thereof is omitted. As shown in FIG. 2, when an optical fiber 21 is used as the above-described nonlinear optical medium 16, pump light is inputted into the optical fiber 21 together with signal light, whereby four wave mixing (FWM) occurs.

The pump light generator 13 may be configured so that the wavelength $\lambda_p$ of pump light to be generated is made approximately equal to an average zero-dispersion wavelength of the optical fiber 21. The pump light generator 13 may also be configured so that the average zero-dispersion wavelength of the optical fiber 21 is made approximately equal to the wavelength $\lambda_p$ of pump light by controlling the temperature of the optical fiber 21. This allows an efficient occurrence of optical parametric amplification (OPA) by the FWM. The optical fiber 21 requires a length sufficient for producing a nonlinear optical effect.

As the optical fiber 21, for example, a highly nonlinear fiber (HNLF) that has been improved in the nonlinear optical effect may be used. The HNLF includes: a type increased in the nonlinear refractive index by doping a core with germanium, bismuth, or the like; a type increased in the optical power density by designing a mode field to a small dimension (i.e., narrowing the mode field); and a type using a photonic crystal fiber structure.

Figure 3:
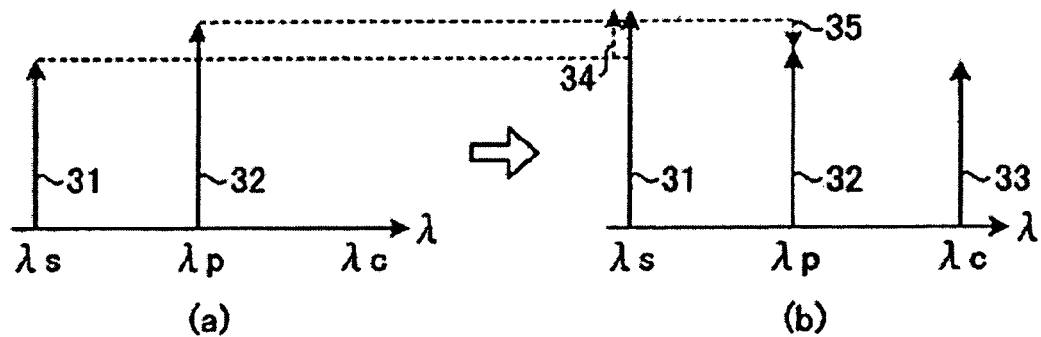
FIG. 3 is a diagram showing example wavelength allocations of signal light and pump light.

FIG. 3 is a diagram showing wavelength allocations of signal light and pump light. In FIG. 3, the horizontal axis denotes the wavelengths $\lambda$ ($\lambda_s$, $\lambda_p$) of signal light and pump light. The vertical axis denotes the power $P_s$ of signal light and the power $P_p$ of pump light. FIG. 3($a$) shows wavelength allocations of signal light and pump light inputted into the nonlinear optical medium 16. FIG. 3($b$) shows wavelength allocations of the signal light and the pump light outputted from the nonlinear optical medium 16.

Symbol 31 denotes the wavelength allocations of the signal light. Symbol 32 denotes the wavelength allocations of the pump light. Here, the wavelength $\lambda_s$ of the signal light inputted into the nonlinear optical medium 16 is assumed to be shorter than the wavelength $\lambda_p$ of the pump light inputted into the nonlinear optical medium 16. The wavelength difference ($\lambda_p-\lambda_s$) between the signal light and the pump light is, for example, several nanometers to several tens of nanometers.

Symbol 33 denotes an idler light corresponding to the signal light, the idler light being generated by the FWM occurring when the pump light is inputted into the nonlinear optical medium 16 together with the signal light. The wavelength of the idler light is a wavelength $\lambda_c$ ($\omega_c=2\omega_p-\omega_s$; here, $\omega$=frequency) for a frequency symmetric relative to the signal light around the pump light. At this time, part of energy of the pump light is substantially equally imparted to the signal light and the idler light. As a result, as indicated by symbol 34, the signal light is subjected to OPA.

If the power $P_p$ of pump light is sufficiently higher than the power Ps of signal light (e.g., over 10 times higher), the gain by OPA increases in proportion to approximately the square of the power $P_p$ of pump light. On the other hand, if the power $P_p$ of pump light is not sufficiently higher than the power Ps of signal light, the consumption of the power $P_p$ of pump light due to the FWM increases, so that there occurs depletion in which the power $P_p$ of pump light attenuates as indicated by symbol 35.

Figure 4:
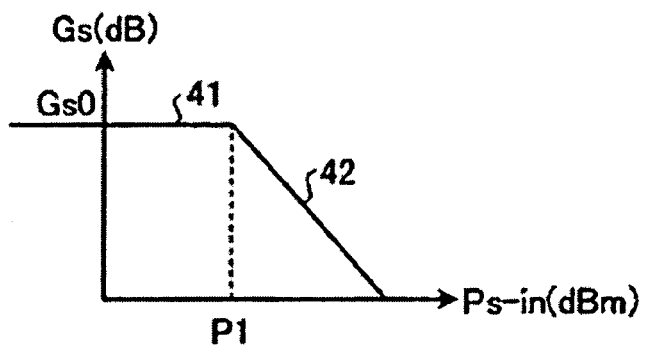
FIG. 4 is a characteristic diagram showing the relationship between the input power of signal light and the power gain of optical parametric amplification.

FIG. 4 is a characteristic diagram showing the relationship between the input power of signal light and the OPA. In FIG. 4, the horizontal axis denotes the input power Ps-in (dBm) inputted into the signal light input port 11. The vertical axis denotes the gain $G_s$ (dB) of signal light by the OPA in the nonlinear optical medium 16. Here, the power $P_p$ is assumed to be constant.

If the input power Ps-in of signal light is lower than a specified threshold power $P_1$, the gain Gs by the OPA is constant (=$G_{sO}$) as indicated by symbol 41. If the input power $P_{s\text{-}in}$ of signal light is higher than the threshold power $P_1$, depletion of pump light occurs, the gain by the OPA becomes rapidly saturated. As a result, the gain Gs by the OPA decreases as indicated by symbol 42.

The power $P_p$ has been explained as being constant, but in actuality, in order to saturate the OPA, a relative power between signal light and pump light is adjusted by the power adjustor 12 and the power adjustor 14. For example, the power adjustor 12 and the power adjustor 14 saturates the OPA by performing an adjustment such that the power of signal light and that of pump light become substantially equal to each other.

Figure 5:
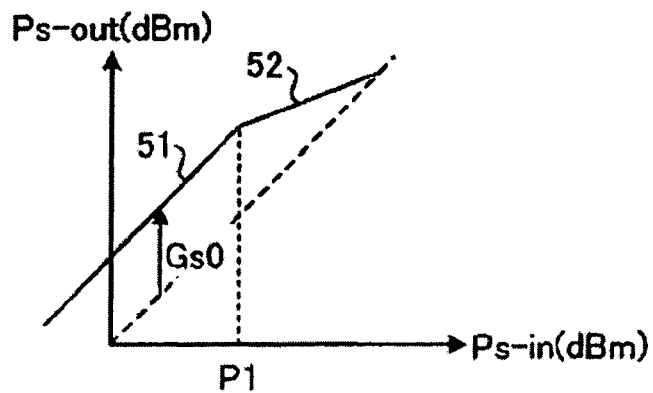
FIG. 5 is a characteristic diagram showing the relationship between the input power and the output power of signal light.

FIG. 5 is a characteristic diagram showing the relationship between the input power and the output power of signal light. In FIG. 5, the horizontal axis denotes the input power $P_{s\text{-}in}$ (dBm) of signal light inputted into the signal light input port 11. The vertical axis denotes the output power $P_{s\text{-}out}$ (dBm) of signal light outputted from the nonlinear optical medium 16.

The solid line indicates the power $P_{s\text{-}out}$ outputted after having been subjected to an OPA in the nonlinear optical medium 16. The dotted line indicates the $P_{s\text{-}out}$ at the time when the gain $G_s$ by the OPA in the nonlinear optical medium 16 is assumed to be zero. Here, the input power of pump light is assumed to be constant.

The power $P_{s\text{-}out}$ increases with an increase in the power $P_{s\text{-}in}$. When the power $P_{s\text{-}in}$ is lower than the constant threshold power $P_1$, the power $P_{s\text{-}out}$ (solid line) of signal light increases by the gain $G_{sO}$ by the OPA, as indicated by symbol 51.

When the power $P_{s\text{-}in}$ becomes higher than the power $P_1$, the power $P_{s\text{-}out}$ (solid line) decreases in the gain $G_s$ by the OPA (refer to FIG. 4), to thereby approaches the power $P_{s\text{-}out}$ (dotted line) at the time when the gain $G_s$ by the OPA is zero, as indicated by symbol 52.

As a consequence, even if the power $P_{s\text{-}in}$ increases, the power $P_{s\text{-}out}$ outputted from the nonlinear optical medium 16 does not become higher than a certain value. Accordingly, within a range within which the power $P_{s\text{-}in}$ is not more than the threshold power $P_1$, the optical waveform controller 10 operates as an optical amplifier with linear gains, while, within a range within which the power $P_{s\text{-}in}$ is higher than the threshold power $P_1$, the optical waveform controller 10 operates as a limiter for suppressing intensity fluctuations of the power $P_{s\text{-}out}$.

Figure 6:
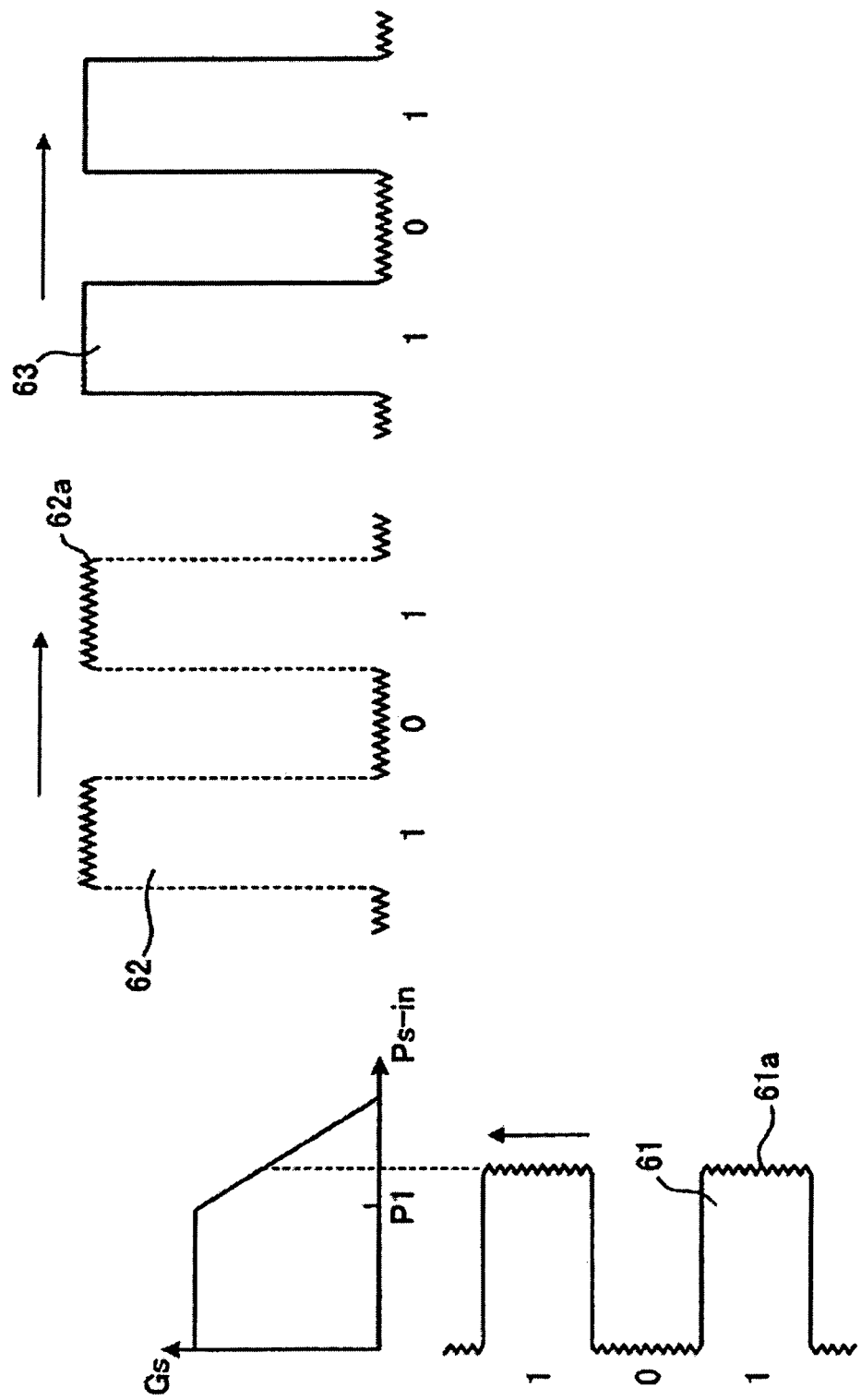
FIG. 6 is a diagram showing signal light outputted from a nonlinear optical medium.

FIG. 6 is a diagram showing signal light outputted from the nonlinear optical medium. In FIG. 6, symbol 61 denotes an example of signal light inputted into the nonlinear optical medium 16. The signal light 61 is an intensity modulated signal light having a power of "0" or "1". Other examples of signal light include optical phase modulated signal light, optical frequency modulated signal light, and signal light obtained by subjecting an RZ pulse to phase modulation or frequency modulation. Symbol 61a denotes intensity noises due to ASE noises, etc. contained in the signal light 61. The power $P_{s\text{-}in}$ of the signal light 61 is adjusted so that the OPA is saturated by the power adjustor 12 ($P_{s\text{-}in} > P_1$).

Symbol 62 denotes signal light outputted from the nonlinear optical medium 16 at the time when the OPA is assumed to be unsaturated. When the OPA is unsaturated, intensity fluctuations are not suppressed, so that the signal light 62 is outputted from the nonlinear optical medium 16, with intensity noises 62a still contained therein.

Symbol 63 denotes signal light outputted from the nonlinear optical medium 16 when the OPA is saturated. When the OPA is saturated, since intensity fluctuations are suppressed, the signal light 63 is outputted from the nonlinear optical medium 16, with intensity noises of the level "1" removed therefrom.

In the above-described configuration of the optical waveform controller 10, firstly, the power of pump light is adjusted by the power adjustor 14 so that sufficient OPA is generated. Next, the power of signal light is adjusted by the power adjustor 12 so that the OPA is saturated. Thus, the optical waveform controller 10 comes to serve as an optical limiter amplifier.

By the pump light generator 13 outputting pump light with a pulse (repetition) frequency sufficiently higher than a modulation frequency of signal light, some optical pulse can be synchronized with one signal light beam. This allows signal light and pump light to synchronize with each other without the need to adjust the output timing of the pump light in conformance with that of the signal light. Here, higher the pulse frequency of the pump light, easier the signal light and the pump light can be synchronized with each other.

The term "synchronization" typically means that a signal light beam and an optical pulse are transmitted while keeping a state in which their timings are conformed with each other, but the "synchronization" described in the embodiment also includes a case where the time period during which their timings conform is short, and a case where the timing of a signal light beam and that of an optical pulse partly conform.

Since the wavelength $\lambda s$ of signal light and the wavelength $\lambda p$ of pump light are different from each other, there occurs a temporal mismatch between the signal light and the pump light due to chromatic dispersion or fluctuations in the nonlinear optical medium 16. As a result, pump light is synchronized with each signal light beam in an average manner, and can impart a uniform gain to each signal light beam.

The optical waveform controller 10 can perform waveform control with respect to signal light modulated, e.g., by intensity modulation or optical frequency modulation. Specifically, the optical waveform controller 10 can reduce intensity noises contained in signal light while amplifying the signal light modulated, e.g., by the intensity modulation or the optical frequency modulation.

Also, because the waveform -control by the optical waveform controller 10 does not affect the phase of signal light, the optical waveform controller 10 can perform waveform control with respect to signal light modulated by optical phase modulation, as well. Therefore, with respect to the optical phase modulated signal light, the optical waveform controller 10 can reduce intensity noises to thereby reduce phase noises (AM/PM conversion noises) occurring in a transmission path fiber, optical circuitry, light/electricity converting circuitry due to the intensity noises.

The case has been explained in which the powers of the signal light and the pump light are adjusted by the power adjustor 12 and the power adjustor 14, respectively. However, in order to saturate the OPA, it suffices only to adjust a relative power between the signal light and the pump light. Also, a configuration may be used in which only either one of the power adjustor 12 and the power adjustor 14 is provided.

A configuration may also be employed in which the chromatic dispersion of the optical fiber 21 as the nonlinear optical medium 16 is made large. Furthermore, a medium providing timing shifts different for each wavelength may be inserted into the nonlinear optical medium 16 such as the optical fiber 21. For example, a dispersion compensation optical fiber or a single mode fiber (SMF) in each of which dispersion per unit length is large, is inserted into the optical fiber 21. This further increases the temporal mismatch between signal light and pump light, thereby allowing a more uniform gain to be imparted to each signal light beam.

Also, for a nonlinear optical effect in the nonlinear optical medium 16, the configuration employing OPA has been described. However, a configuration using optical Raman amplification for a nonlinear optical effect in the nonlinear optical medium 16 may also be used by setting the wavelength $\lambda_p$ of pump light. In the configuration using the optical Raman amplification, the optical waveform controller 10 can be used as an optical limiter as in the case of the above-described configuration.

In this manner, according to the optical waveform controller 10 in the first embodiment, by saturating the gain of signal light based on the nonlinear optical effect, it is possible to impart a linear gain to the attenuated signal light (re-amplifying), and to suppress intensity noises contained in the signal light to thereby reshape the signal light. That is, waveform control (2R regeneration) can be performed with respect to the attenuated signal light.

Also, according to the optical waveform controller 10 in the first embodiment, some optical pulse can be synchronized with respect one signal light beam, by outputting pump light having a pulse frequency higher than the modulation frequency of signal light. This allows the signal light and the pump light to synchronize with each other without the need to adjust the output timing of the pump light in conformance with that of the signal light.

Therefore, there is no need to provide a clock recovery circuit for detecting the timing of signal light. Also, even when addressing a plurality of kinds of signal light beams, there is no need to provide a plurality of clock recovery circuits corresponding to respective signal light beams. This allows the downsizing, simplification, and cost reduction of the apparatus.

Second Embodiment

Figure 7:
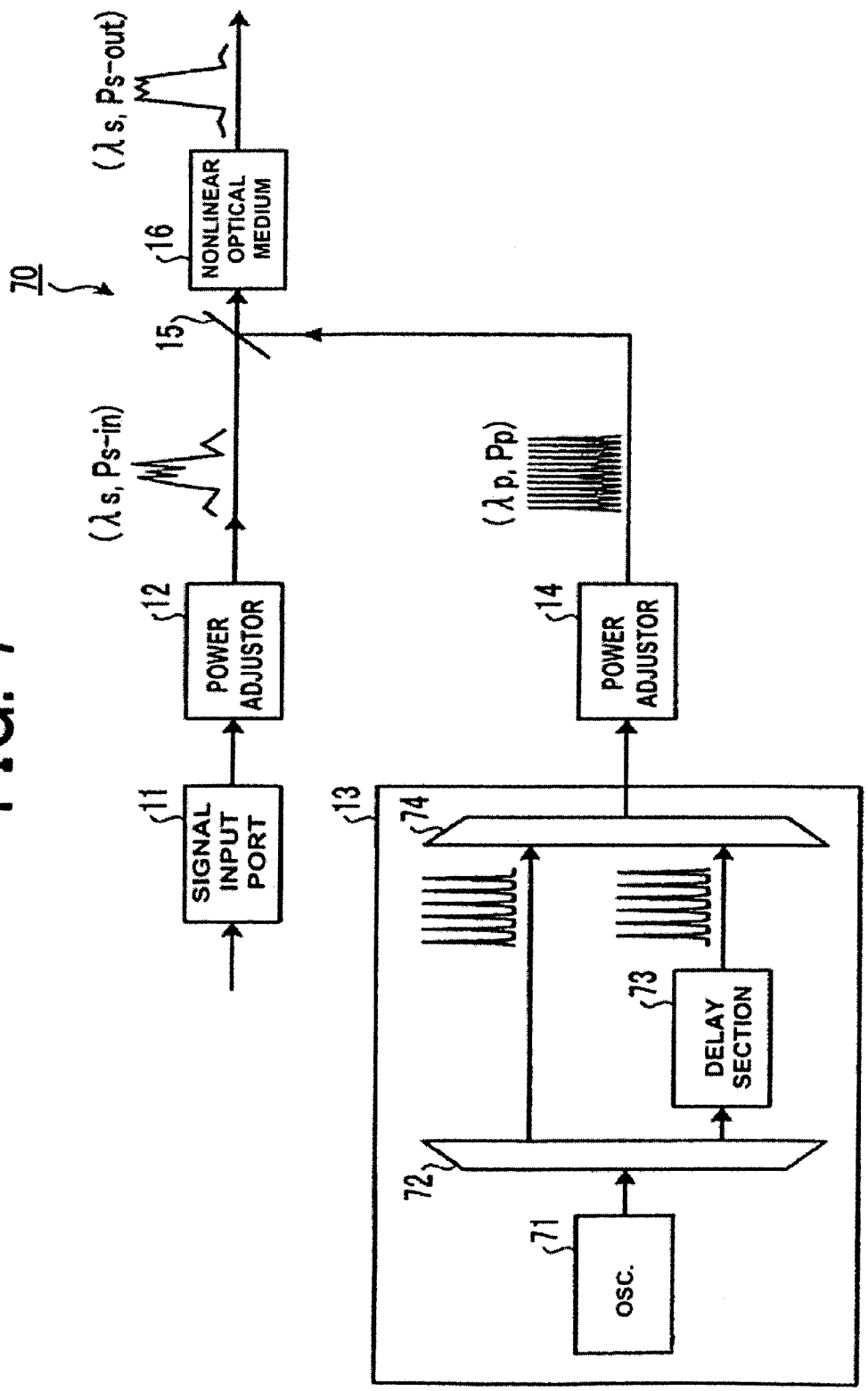
FIG. 7 is a block diagram showing the configuration of an optical waveform controller according to a second embodiment.

FIG. 7 is a block diagram showing the configuration of an optical waveform controller according to a second embodiment of the embodiment. In FIG. 7, the same components as those shown in FIG. 1 are designated by the same symbols, and description thereof is omitted. As shown in FIG. 7, the pump light generator 13 of the optical waveform controller 70 according to the second embodiment generates pump light having a pulse frequency higher than the modulation frequency of signal light, by time-multiplexing optical pulse trains narrower in the width (lower in the duty ratio) than the signal light.

Specifically, the pump light generator 13 includes an oscillator 71, a branching section 72, a delay section 73, and a multiplexing section 74. The oscillator 71 generates an optical pulse train having a width narrower than that of signal light and outputs it to the branching section 72. The branching section 72, which branches the optical pulse train outputted from the oscillator 71, outputs one of branched pulse train to the multiplexing section 74, and outputs the other of branched pulse train to the delay section 73.

The delay section 73 delays the optical pulse train outputted from the branching section 72, and outputs it to the multiplexing section 74. The delay amount of an optical pulse train by the delay section 73 is, for example, one half of the cycle of the optical pulse. This allows generation of pump light beams constituted of a uniformly-spaced optical pulse train. However, the delay amount of the optical pulse train by the delay section 73 is not limited to one half of the cycle of the optical pulse. Besides, the pump light is not necessarily required to be a uniformly-spaced optical pulse train.

The multiplexing section 74 combines an optical pulse train outputted from the branching section 72 and an optical pulse train outputted from the delay section 73, and outputs the combined optical pulse train to the power adjustor 14. As a consequence, the optical pulse train that has been outputted from the oscillator 71 and branched by the branching section 72 is time-multiplexed, which allows pump light with a high pulse frequency to be generated. Also, because the optical pulse can easily make its peak power high as compared with the CW light, pump light with a high peak power can be generated.

Although the configuration has been described in which the optical pulse train that has been generated by the single oscillator 71 is branched and time-multiplexed, a configuration may be used in which optical pulse trains that have been generated by a plurality of respective oscillators 71 are branched and time-multiplexed. Furthermore, although a configuration in which two pulse trains are time-multiplexed has been described, a configuration in which more pulse trains are time-multiplexed may be employed. For example, a configuration may be used in which about 3 to 16 optical pulse trains are time-multiplexed, with delays different for each optical pulse train provided.

In this way, according to the optical waveform controller 10 in the second embodiment, by time-multiplying an optical pulse train having a width narrower than that of signal light, pump light that is high in the peak power and the pulse frequency can be easily generated. It is, therefore, possible to provide a higher gain to each signal light beam, and to synchronize the signal light and the pump light in a more efficient manner, to thereby provide a uniform gain to each signal light beam. The configuration of the optical waveform controller 70 according to the second embodiment can be applied to each embodiment described hereinafter.

Third Embodiment

Figure 8:
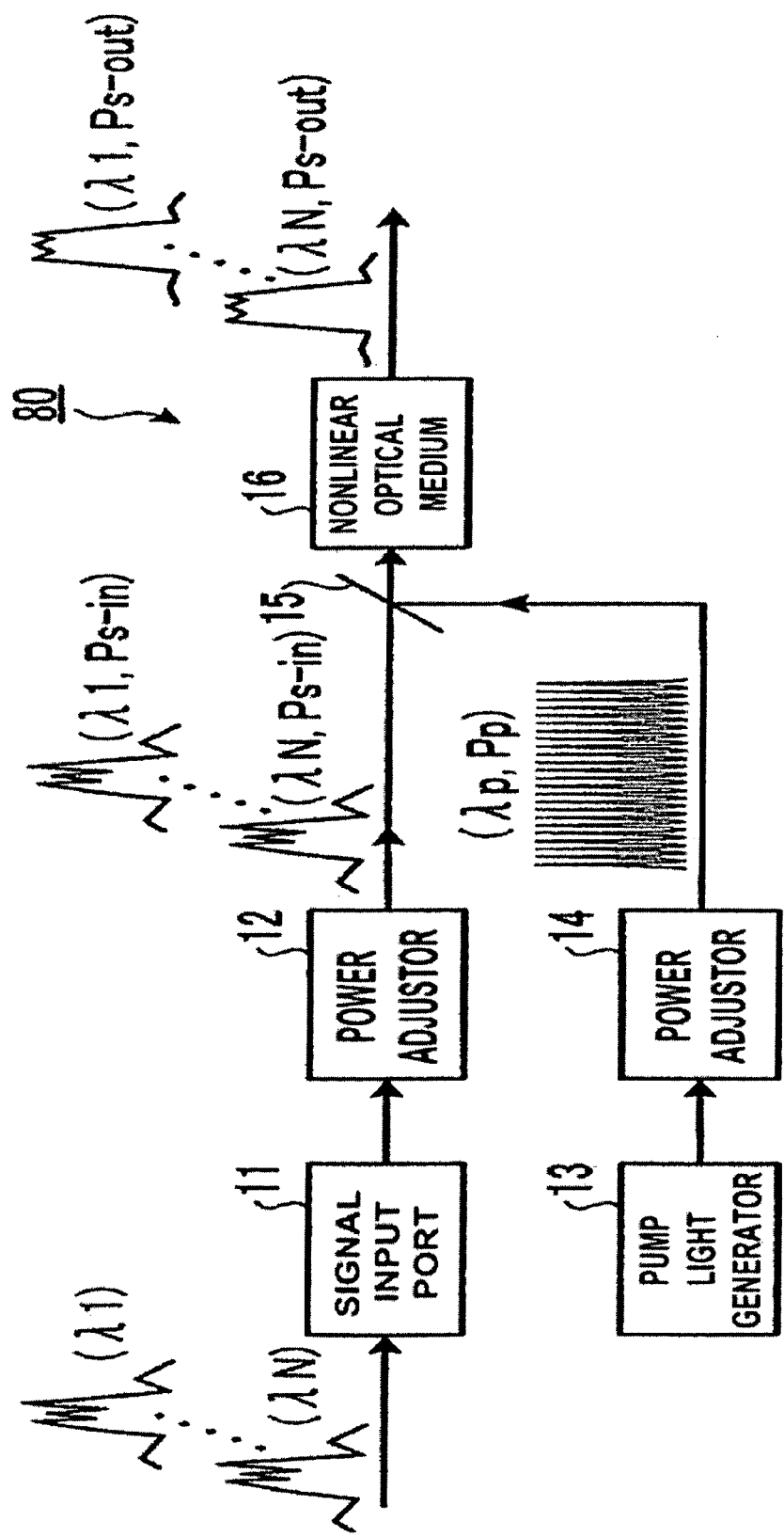
FIG. 8 is a block diagram showing the configuration of an optical waveform controller according to a third embodiment.

FIG. 8 is a block diagram showing the configuration of an optical waveform controller according to a third embodiment. In FIG. 8, the same components as those shown in FIG. 1 are designated by the same symbols, and description thereof is omitted. As shown in FIG. 8, to the signal light input port 11 of the optical waveform controller 80 according to the third embodiment, WDM signal light in which signal light beams having respective wavelengths of $\lambda_1$ to $\lambda_N$ have been subjected to wavelength division multiplexing, is inputted.

The pump light generator 13 generates, as pump light, an optical pulse train having a frequency higher than the modulation frequency of each signal light beam contained in WDM signal light. It is, therefore, possible to synchronize some optical pulse with each signal light beam contained in the WDM. This allows signal light and pump light to synchronize with each other without the need to adjust the output timing of pump light in conformance with that of signal light.

Therefore, there is no need to provide a clock recovery circuit for detecting the timing of signal light. Also, even when addressing WDM signal light, in which a large number of signal light beams have been subjected to wavelength division multiplexing, there is no need to provide a plurality of clock recovery circuits corresponding to respective signal light beams. This allows the downsizing, simplification, and cost reduction of the apparatus.

The pump light generator 13 generates pump light having a wavelength different from that of each signal light beam contained in the WDM signal light (i.e., $\lambda_p \neq \lambda_1$ to $\lambda_N$). As a consequence, each signal light beam contained in the WDM signal light and pump light temporally shift, so that a uniform gain can be imparted to each signal light beam contained in WDM signal light.

The wavelength $\lambda_p$ of pump light may be set to a value in the vicinity of average dispersion wavelength of the optical fiber 21. In this case, the amount of dispersion in the wavelength of the signal light in each channel can be large by utilizing a dispersion slope of the optical fiber 21. This allows the generation efficiency of FWM to become constant in each channel of the WDM signal light.

In this manner, according to the optical waveform controller 80 in the third embodiment, the waveform control can be performed without the need to perform the tuning of wavelength. This makes it possible to produces the effects of the optical waveform controller 10 according to the first embodiment, and in addition, to perform waveform control with respect to the WDM signal light without applicable wavelengths of signal light being limited.

The WDM signal light can be subjected to waveform control in a collective manner without the need to branch the WDM signal light for each channel. As a result, even when addressing WDM signal light, in which a large number of signal light beams have been subjected to wavelength division multiplexing, there is no need to provide a plurality of clock recovery circuits corresponding to respective signal light beams. This allows the downsizing, simplification, and cost reduction of the apparatus.

Fourth Embodiment

Figure 9:
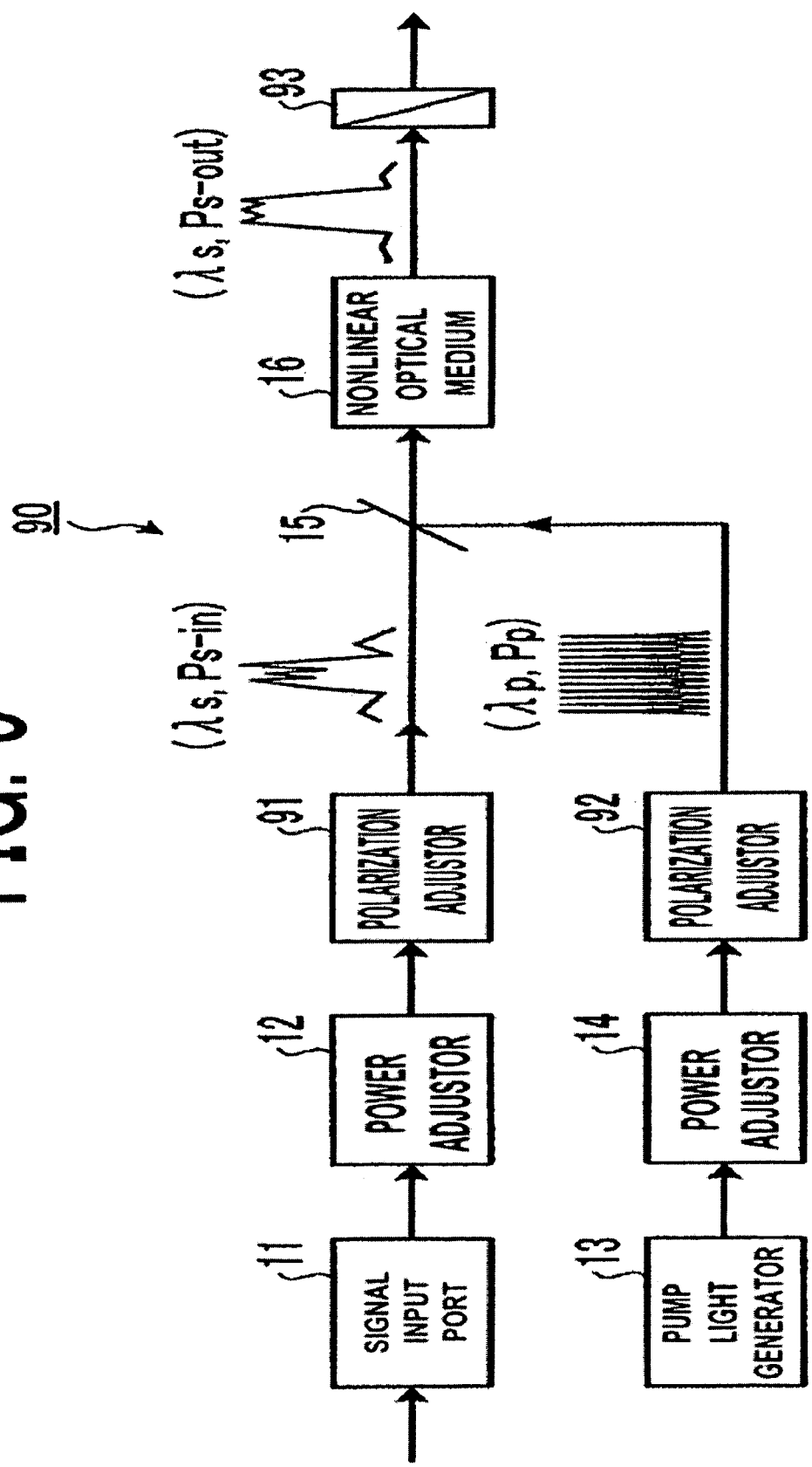
FIG. 9 is a block diagram showing the configuration of an optical waveform controller according to a fourth embodiment.

FIG. 9 is a block diagram showing the configuration of an optical waveform controller according to a fourth embodiment. In FIG. 9; the same components as those shown in FIG.

1 are designated by the same symbols, and description thereof is omitted. As shown in FIG. 9, the optical waveform controller 90 according to the fourth embodiment includes a polarization adjustor 91, a polarization adjustor 92, and a polarizer 93, in addition to the components of the optical waveform controller 10 according to the first embodiment.

The power adjustor 12 outputs the signal light with power adjusted, to the polarization adjustor 91. The polarization adjustor 91 controls the polarization state of the signal light outputted from the power adjustor 12, and outputs the signal light with the polarization state controlled, to the connecting section 15. The power adjustor 14 outputs the signal light with power adjusted, to the polarization adjustor 92. The polarization adjustor 92 controls the polarization state of the signal light outputted from the power adjustor 14, and outputs the signal light with the polarization state controlled, to the connecting section 15.

The polarization adjustor 91 and the polarization adjustor 92 adjust a relative polarization state between signal light and pump light so that the signal light and the pump light enter polarization states different from each other. Each of the polarization adjustor 91 and the polarization adjustor 92 is, for example, a wavelength plate type polarization controller, a $LiNbO_3$ type polarization controller, a stress type polarization controller, or a Faraday rotor.

The connecting section 15 connects signal light outputted from the polarization adjustor 91 and pump light outputted from the polarization adjustor 92, and outputs the connected light to the nonlinear optical medium 16. The nonlinear optical medium 16 allows the signal light and the pump light outputted from the connecting section 15 to pass therethrough. The nonlinear optical medium 16 outputs the signal light and the pump light that have been allowed to pass through the nonlinear optical medium 16, to the polarizer 93.

The polarizer 93 has a principle axis, and extracts only a linear polarization component in the principle axis direction out of the light outputted from the nonlinear optical medium 16. This principle axis is, for example, a direction perpendicular to a polarization direction of the signal light outputted from the nonlinear optical medium 16. As a consequence, the polarizer 93 cuts off a polarization component in the same polarization state as that of the signal light inputted into the nonlinear optical medium 16.

In the configuration of the above-described optical waveform controller 90, for example, the polarization adjustor 91 adjusts the polarization state of signal light so as to be a linear polarization perpendicular to the principal axis of the polarizer 93. The signal light in this polarization state is cut off by the polarizer 93. On the other hand, the polarization adjustor 92 adjusts the polarization state of pump light so as to be a linear polarization inclined 45 degrees relative to the principal axis of the polarizer 93.

As a result, when the pump light passes through the nonlinear optical medium 16 together with signal light, an amplified signal light is occurred on substantively same polarization state of the pump light and on substantively same frequency of the signal light. The amplified signal light gets close to the polarization state of the pump light. Consequently, the amplified signal light in the signal light is available to pass through a polarization component in the principle direction of the polarizer 93 because the polarization component of the amplified signal light is not orthogonal polarization component to the polarizing axis of the polarizer 93.

Accordingly, by switching on/off of the pump light outputted by the pump light generator 13, an optical switch that switches on/off of the signal light having passed through and outputted from the polarizer 93 can be implemented. In this configuration also, the power adjustor 12 and the power adjustor 14 adjusts the power of signal light and pump light so as to saturate the gain of signal light based on the nonlinear optical effect.

This makes it possible to perform waveform control with respect to signal light in the case where the signal light is outputted. Also, when the signal light passes through the polarizer 93, it is cut off up to the extent that the "0" level portion thereof becomes a sufficiently low value. This allows the suppression of deformation of waveform due to intensity noises at the "0" level contained in the signal light, chromatic dispersion, or dispersion slope, cross-talks with adjacent pulses, and so on.

The configuration has been described in which the polarization adjustor 91 and the polarization adjustor 92, respectively, are arranged in the post-stages of the power adjustor 12 and the power adjustor 14. However, the polarization adjustor 91 and the polarization adjustor 92, respectively, may be arranged in the pre-stages of the power adjustor 12 and the power adjustor 14.

In this way, the optical waveform controller 90 in the fourth embodiment produces the above-described effects of the optical waveform controller 10 according to the first embodiment, and in addition, has a function as an optical switch for switching the on/off of pump light to thereby switch the output/non-output of signal light by controlling the polarization state of the signal light and the pump light.

By exerting the above-described effects of the optical waveform controller 10 according to the first embodiment to thereby remove intensity noises at the "1" level of signal light, and also by the signal light passing through the polarizer 93, the "0" level portion of the signal light is cut off up to the extent that it becomes a sufficiently low value, so that the intensity noises at the "0" level contained in the signal light can be suppressed.

Fifth Embodiment

Figure 10:
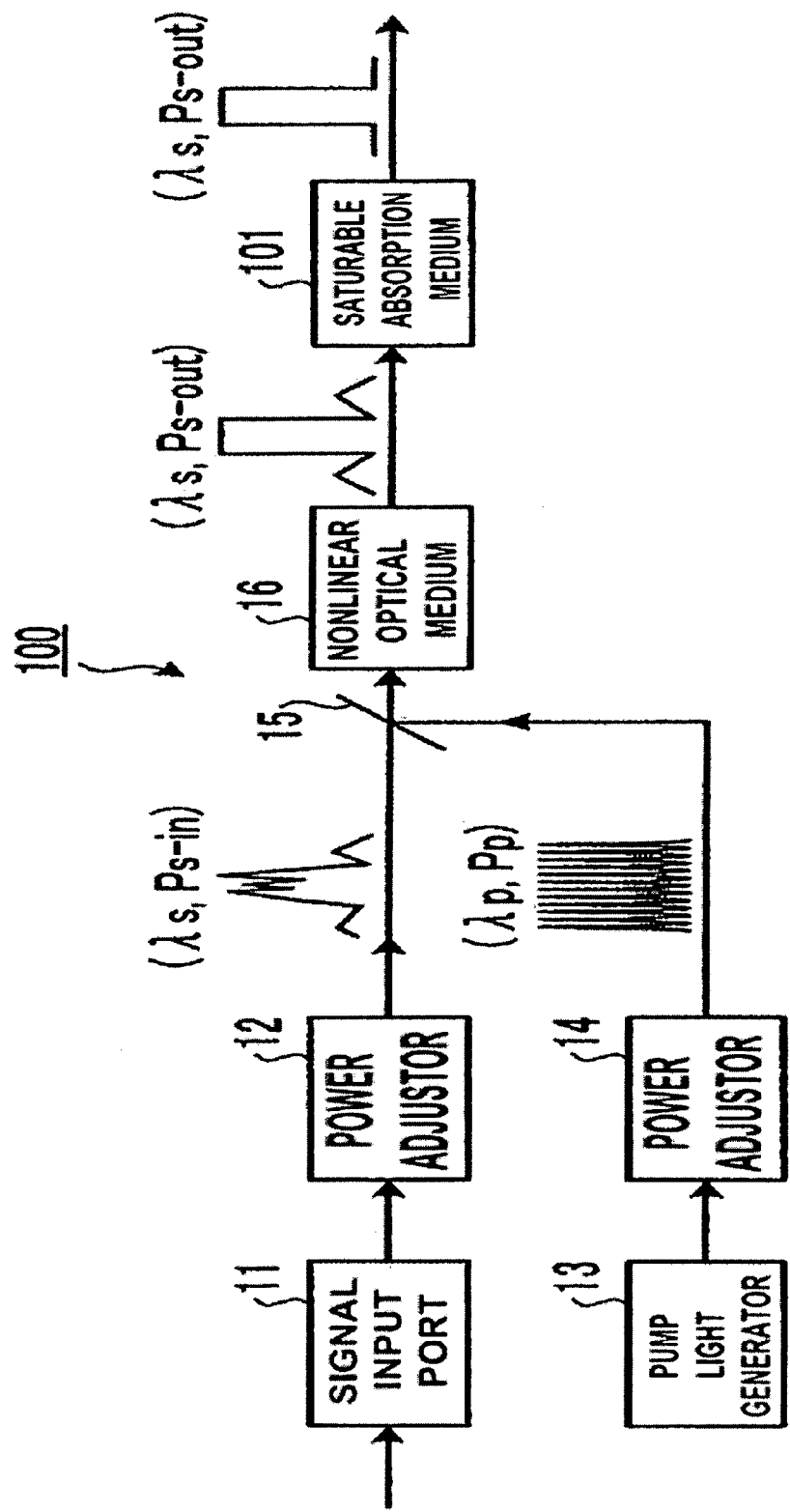
FIG. 10 is a block diagram showing the configuration of an optical waveform controller according to a fifth embodiment.

FIG. 10 is a block diagram showing the configuration of an optical waveform controller according to a fifth embodiment. In FIG. 10, the same components as those shown in FIG. 1 are designated by the same symbols, and description thereof is omitted. As shown in FIG. 10, the optical waveform controller 100 according to the fourth embodiment has a saturable absorption medium 101 in addition to the components of the optical waveform controller 10 according to the first embodiment. The nonlinear optical medium 16 outputs signal light and pump light that have been allowed to pass therethrough, to the saturable absorption medium 101.

The saturable absorption medium 101 suppresses intensity fluctuations at the "0" level of the signal light outputted from the nonlinear optical medium 16. This allows a removal of the intensity noises at the "0" level contained in the signal light. The saturable absorption medium 101 is, for example, a semiconductor saturable absorber, a semiconductor amplifier, a Mach-Zehnder interfemeter type optical fiber switch, or a nonlinear optical loop mirror (NOLM) type switch.

Although the configuration in which the saturable absorption medium 101 is installed in the post-stage of the nonlinear optical medium 16 has been described, the installation place of the saturable absorption medium 101 is not limited to the post-stage of, the nonlinear optical medium 16, as long as it is a place to allow signal light to pass therethrough. For example, the saturable absorption medium 101 may also be provided in the pre-stage of the nonlinear optical medium 16.

In this manner, according to the optical waveform controller 100 in the fifth embodiment, the above-described effects of the optical waveform controller 10 according to the first embodiment are produced, and in addition, intensity fluctuations at the level "0" of signal light is suppressed by the saturable absorption medium 101. This allows a removal of intensity noises at the level "0" of signal light contained in the signal light.

Sixth Embodiment

Figure 11:
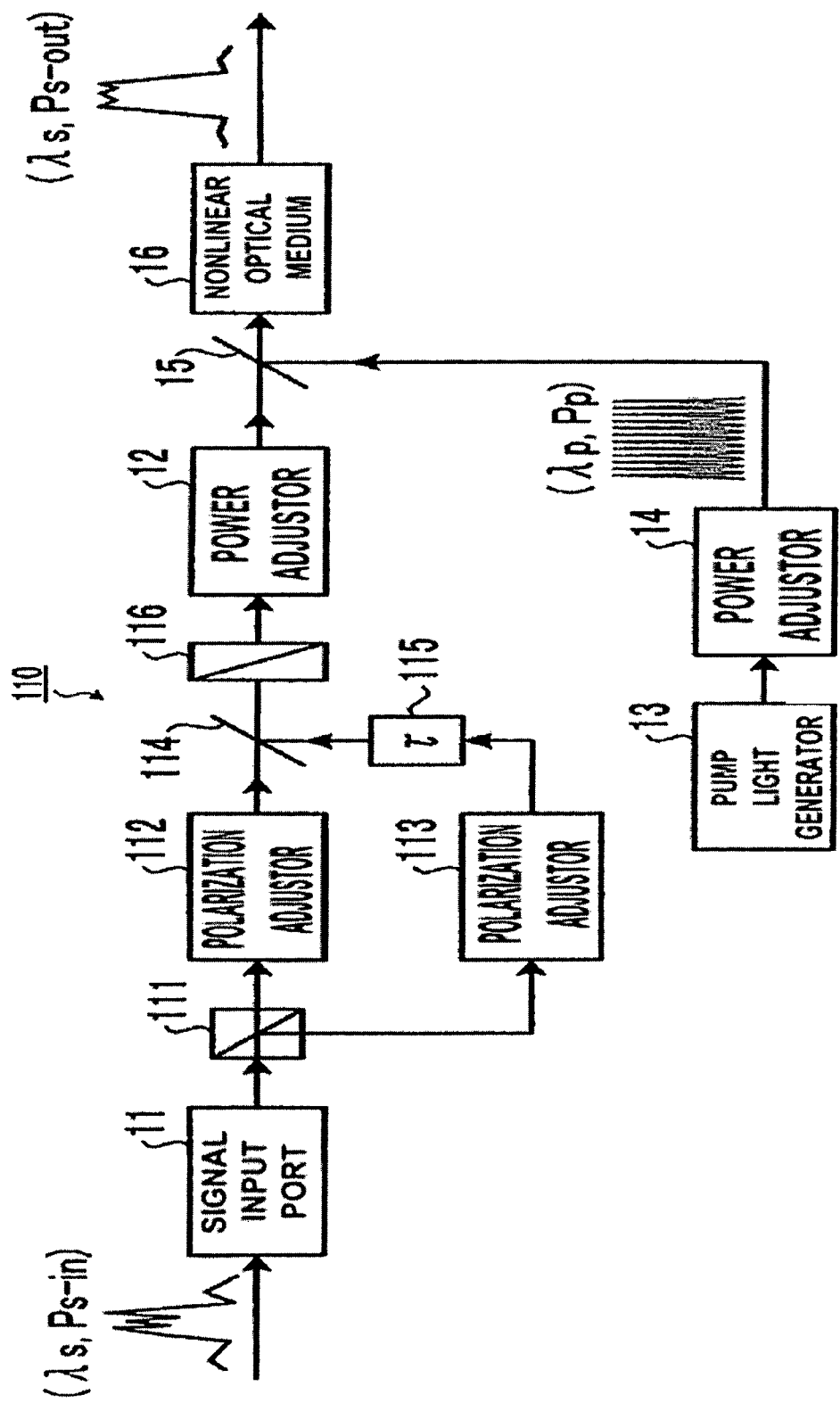
FIG. 11 is a block diagram showing the configuration of an optical waveform controller according to a sixth embodiment.

FIG. 11 is a block diagram showing the configuration of an optical waveform controller according to a sixth embodiment. In FIG. 11, the same components as those shown in FIG. 1 are designated by the same symbols, and description thereof is omitted. The optical waveform controller 110 according to the sixth embodiment avoids the dependency of inputted signal light upon the polarization state by utilizing the polarization diversity.

As shown in FIG. 11, the optical waveform controller 110 includes a polarization beam splitter 111, a polarization adjustor 112, a polarization adjustor 113, a combining section 114, a delay section 115 (τ), and a polarizer 116 in addition to the components of the optical waveform controller 10 according to the first embodiment. The signal light input port 11 outputs inputted signal light to the polarization beam splitter 111.

The polarization beam splitter 111 (PBS) separates the signal light outputted from the signal light input port 11 into a pair of polarization components perpendicular to each other. The polarization beam splitter 111 outputs one of the separated polarization components to the polarization adjustor 112, and outputs the other of the polarization components to the polarization adjustor 113.

The polarization adjustor 112 and the polarization adjustor 113 converts the respective polarization components outputted from the polarization beam splitter 111 into polarization components of linear polarization in directions equal to each other. The polarization adjustor 112 and the polarization adjustor 113 outputs the respective converted polarization components to the combining section 114.

The delay section 115 is provided between the polarization adjustor 113 and the combining section 114. The delay section 115 provides a delay τ to the polarization component to be outputted from the polarization adjustor 113 to the combining section 114, to thereby conform the timings of the respective polarization components to be outputted from the polarization adjustor 112 and the polarization adjustor 113 to the combining section 114. The delay section 115 is, for example, an optical delay device or a Faraday rotor.

If the timings of the polarization components outputted from the polarization adjustor 112 and the polarization adjustor 113 to the combining section 114 conforms to each other without providing the delay section 115, there is no need to provide the delay section 115. The combining section 114 combines the respective polarization components outputted from the polarization adjustor 112 and the polarization adjustor 113. The combining section 114 outputs the combined polarization components to the power adjustor 12.

The polarizer 116 may be provided between the combining section and the adjusting section. By monitoring the power of signal light outputted from this polarizer 116, the adjustment of the polarization state by the polarization adjustor 112 and the polarization adjustor 113 may be controlled so that the monitored power becomes a maximum value. In this case, a polarization beam splitter may be provided instead of the polarizer 116.

In this way, according to the optical waveform controller 110 in the sixth embodiment, the above-described effects of the optical waveform controller 10 according to the embodiments are produced, and in addition, the utilization of the polarization diversity allows a stable waveform control with respect to signal light irrespective of the polarization state of the inputted signal light.

In the above description, the polarization diversity method for bringing the signal light inputted into the nonlinear optical medium into a single polarization state, has been shown. There are also other polarization diversity methods usable. Examples thereof are: a polarization diversity method wherein the same optical waveform controllers are prepared for two orthogonal polarization components, and after each of the polarization components has been waveform-reshaped, they are polarization-synthesized; a polarization diversity method wherein pump light having two orthogonal polarization components is prepared and waveform-reshaped; and a method wherein the polarization of pump light is randomly modulated by a polarization scrambler or the like, and average waveform reshaping is performed with respect to all polarization states of signal light.

Seventh Embodiment

Figure 12:
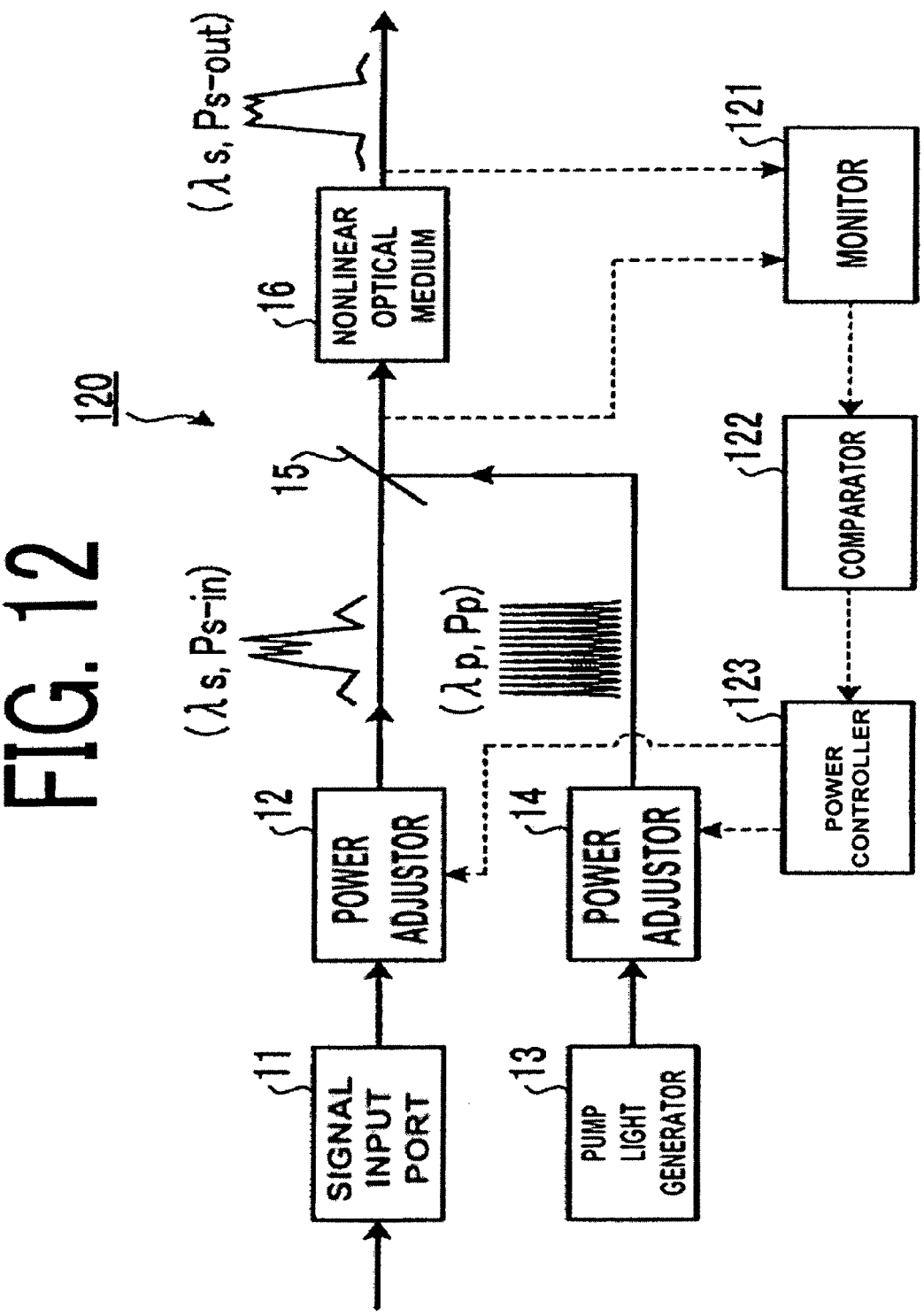
FIG. 12 is a block diagram showing the configuration of an optical waveform controller according to a seventh embodiment.

FIG. 12 is a block diagram showing the configuration of an optical waveform controller according to a seventh embodiment. In FIG. 12, the same components as those shown in FIG. 1 are designated by the same symbols, and description thereof is omitted. As shown in FIG. 12, the optical waveform controller 120 according to the seventh embodiment includes a monitor section 121, a comparator 122, and a power controller 123 in addition to the components of the optical waveform controller 10 according to the first embodiment.

The monitor section 121 detects the power of signal light inputted into the nonlinear optical medium 16 and the power of signal light outputted from the nonlinear optical medium 16. Specifically, the monitor section 121 branches part of the signal light inputted into the nonlinear optical medium 16 to thereby acquire it, and detects the power (input power) of the acquired signal light. The monitor section 121 also branches part of the signal light outputted from the nonlinear optical medium 16 to thereby acquire it, and detects the power (output power) of the acquired signal light. The monitor section 121 outputs information on the input power and the output power that have been detected, to the comparator 122.

Based on the information on the input power and the output power outputted from the monitor section 121, the comparator 122 calculates the difference between the output power and the input power to thereby calculate a gain in the nonlinear optical medium 16. The comparator 122 outputs the information on the calculated gain to the power controller 123. The comparator 122 may be configured to calculate the difference between the input power or the output power outputted from the monitor section 121 and a predetermined threshold value.

The power controller 123 controls the power adjustor 12 and the power adjustor 14, based on the information on the gain outputted from the comparator 122. For example, the power controller 123 controls the power adjustment amount of the power adjustor 14 so that a sufficient gain can be obtained by OPA.

Next, the power controller 123 controls the power adjustment amount of the power adjustor 12 up to the extent that a gain by the OPA decreases, thereby saturating the OPA.

Figure 13:
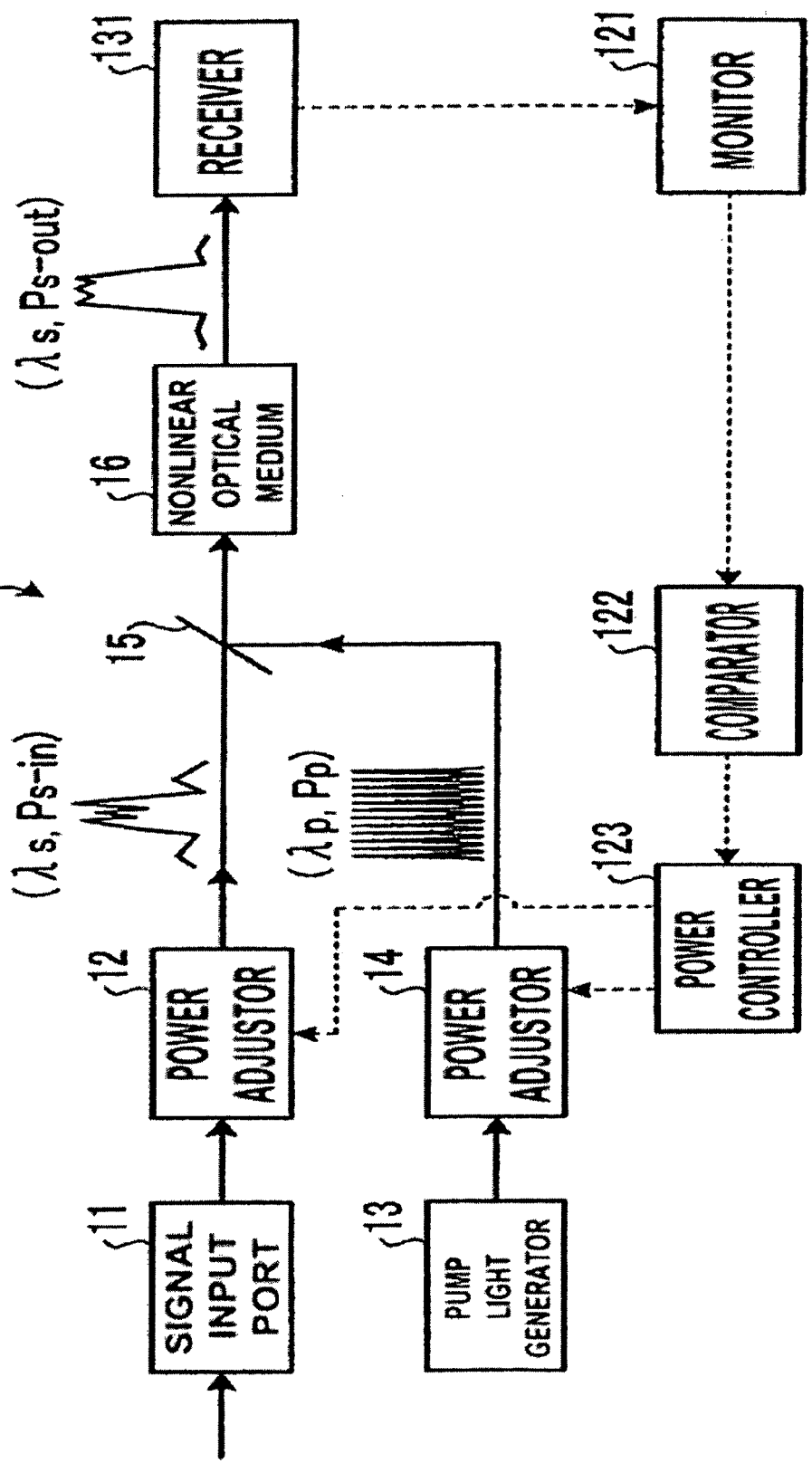
FIG. 13 is a block diagram showing a modification the configuration of the optical waveform controller according to the seventh embodiment.

FIG. 13 is a block diagram showing a modification of the configuration the optical waveform controller according to the seventh embodiment. In FIG. 13, the same components as those shown in FIG. 12 are designated by the same symbols, and description thereof is omitted. The modification of the optical waveform controller 120 according to the seventh embodiment has a receiver 131.

The receiver 131 receives signal light and pump light outputted from the nonlinear optical medium 16. The receiver 131 outputs the received signal light to the monitor section 121. The monitor section 121 monitors the reception status of the signal light outputted from the receiver 131. The reception status of signal light refers to, for example, the optical S/N ratio, Q value, or bit error rate (BER) of the signal light.

The monitor section 121 outputs information on the reception status of the signal light to the comparator 122. The comparator 122 calculates the difference between the information on the reception status of the signal light, outputted from the monitor section 121 and a predetermined threshold value. The comparator 122 outputs information on the calculated difference regarding the reception status of the signal light, to the power controller 123.

Based on the information on the difference regarding the reception status of the signal light, outputted from the comparator 122, the power controller 123 controls the power adjustor 12 and the power adjustor 14. For example, the power controller 123 controls the power adjustment amount of the power adjustor 12 and the power adjustor 14 so that the reception status of the signal light becomes optimum.

In this way, according to the optical waveform controller 120 in the seventh embodiment, the above-described effects of the optical waveform controller 10 according to the first embodiment are produced, and in addition, the powers of signal light and pump light can be automatically controlled by feeding back monitored results of the signal light that has been subjected to waveform control. This allows the waveform control with respect to signal light to be automatically performed.

While not shown in the figure, in the above-described optical waveform controller 90 (refer to FIG. 9), a configuration may be used in which the polarization states of signal light and pump light are automatically controlled by feeding back the monitored results of signal light. Specifically, a polarization control section is provided, and the polarization control section controls the polarization adjustor 91 and the polarization adjustor 92 based on the information on the reception status of the signal light, outputted from the comparator 122.

Eighth Embodiment

Figure 14:
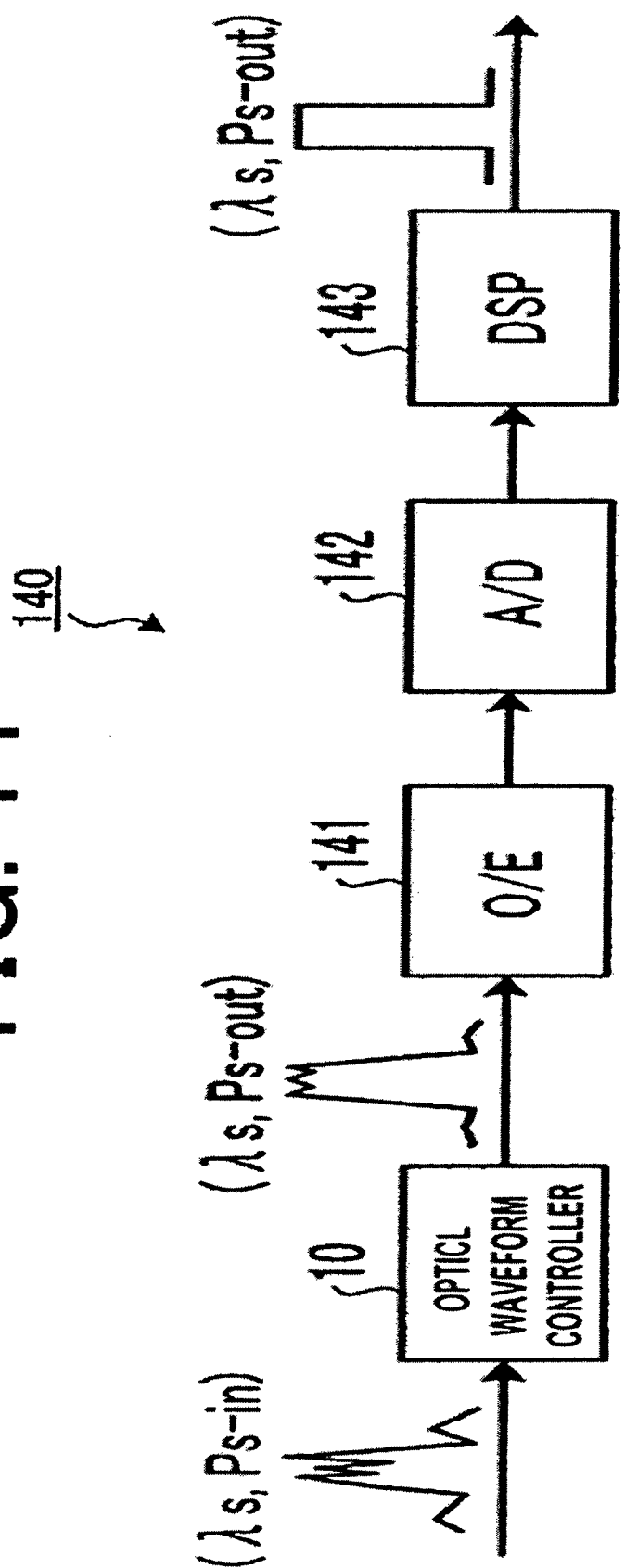
FIG. 14 is a block diagram showing the configuration of an optical waveform controller according to an eighth embodiment.

FIG. 14 is a block diagram showing the configuration of an optical waveform controller according to an eighth embodiment. In FIG. 14, the same components as those shown in FIG. 1 are designated by the same symbols, and description thereof is omitted. As shown in FIG. 14, the optical signal processor 140 according to the eighth embodiment includes an opto/electric (O/E) conversion section 141, a digital (A/D) conversion section 142, and a digital signal processing section 143 (DSP) in addition to the optical waveform controller 10 according to the first embodiment.

The optical waveform controller 10 outputs signal light that has been subjected to waveform control, to the opto/electric conversion section 141. The opto/electric conversion section 141 converts the signal light outputted from the optical waveform controller 10 into an electric signal, and outputs it to the digital conversion section 142. The digital conversion section 142 converts the electric signal outputted from the opto/electric conversion section 141 into a digital signal, and outputs it to the digital signal processing section 143.

The digital signal processing section 143 (DSP) subjects the digital signal outputted from the digital conversion section 142 to digital signal processing. The digital conversion section 142 is constituted of, for example, a central processing unit (CPU) or a field programmable gate array (FPGA). The digital conversion section 142 performs waveform reshaping or the suppression of amplitude noises with respect to signal light.

Alternatively, the digital conversion section 142 performs electric dispersion compensation (EDC), forward error correction (FEC), processing wherein estimation is performed by subjecting a received signal to quantum coding, maximum likelihood sequence estimation (MLSE), processing wherein a received signal is subjected to quantum coding, and sequential estimation is performed using the quantum coding in combination with computer simulation, or various other digital signal processings.

By performing waveform control with respect to signal light by the optical waveform controller 10, it is possible to reshape the waveform of the signal light and to improve the optical S/N ratio thereof. By applying digital signal processing to the signal light that has been subjected to the waveform reshaping and the improvement in the optical S/N ratio, the accuracy of the digital signal processing can be enhanced. This allows an increase in the margin of the optical communications system.

For example, when the digital conversion section 142 performs EDC with respect to signal light, since the waveform of signal light has been reshaped and the optical S/N ratio thereof has been improved by the waveform control, the effect of EDC can be improved, and correspondingly, the transmission distance or the distance between optical amplifiers for relay can be increased. This allows a reduction in the number of optical amplifiers.

Also, for example, when the digital conversion section 142 performs FEC with respect to signal light, since the waveform of signal light has been reshaped and the optical S/N ratio thereof has been improved by the waveform control, redundancy to be added to the signal light for securing required BER can be reduced. This allows the required BER to be secured without the need to increase the effective transmission rate of the optical communications system.

The configuration in which the optical waveform controller 10 is applied to the optical signal processor 140 has been described, but besides the optical waveform controller 10, any of the optical waveform controllers 70, 80, 90, 100, 110, and 120 according to the above-described embodiments can also be applied to the optical signal processor 140. A configuration may also be used in which the waveform control of signal light by the optical waveform controller 10 is performed, for example, up to the extent that the quality of a signal improved by digital signal processing becomes a sufficient quality.

Figure 15:
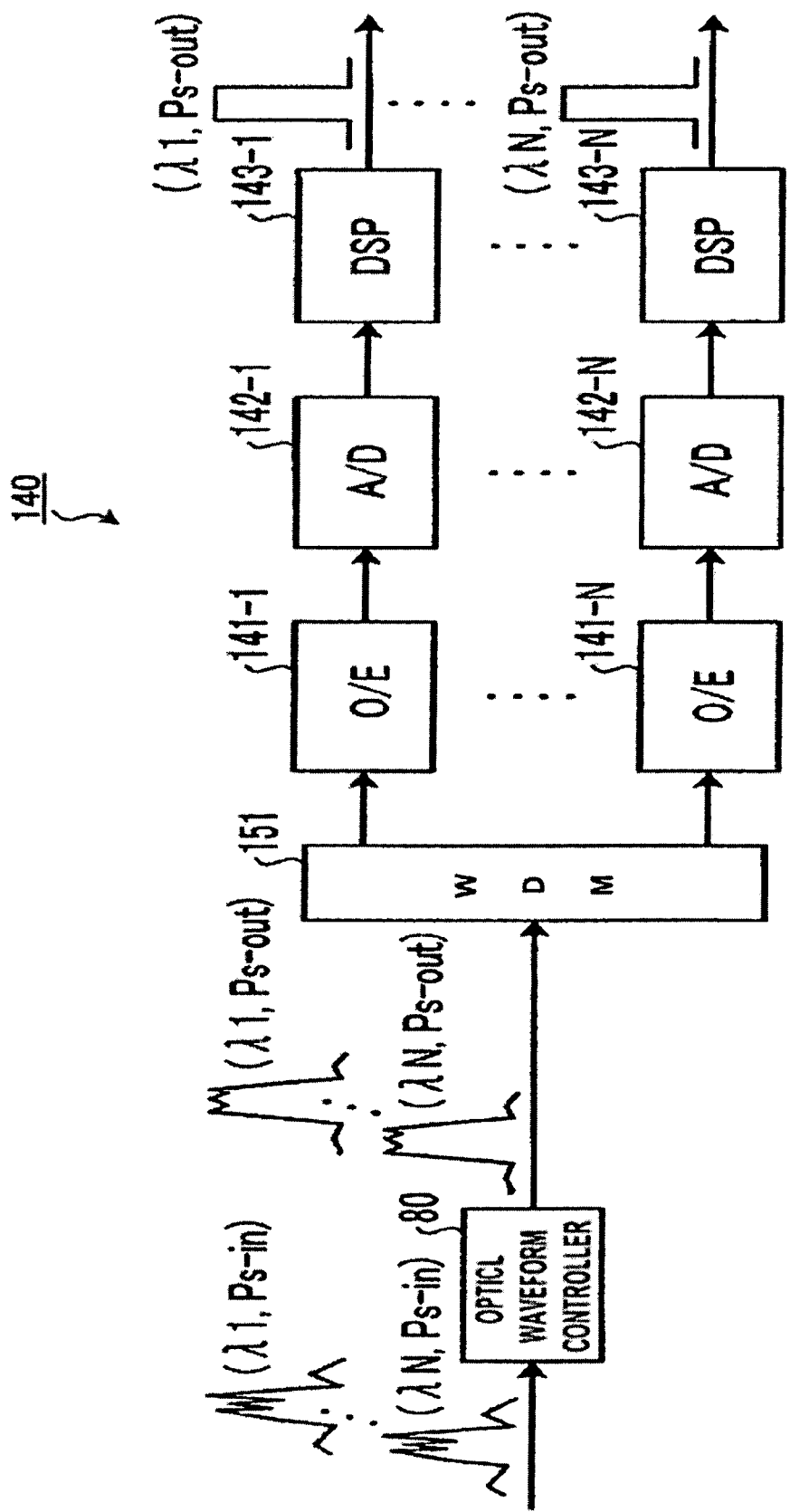
FIG. 15 is a block diagram showing a modification of the configuration of the optical waveform controller according to the eighth embodiment.

FIG. 15 is a block diagram showing a modification of the configuration of the optical waveform controller according to the eighth embodiment. In FIG. 15, the same components as those shown in FIG. 14 are designated by the same symbols, and description thereof is omitted. As shown in FIG. 15, the modification of the optical signal processor 140 according to the eighth embodiment includes the above-described optical waveform controller 80 (refer to FIG. 8) and a demultiplexing section 151.

In correspondence with the multiple number N of WDM signal light, the modification of the optical signal processor 140 includes the opto/electric conversion sections 141, the digital conversion sections 142, and the digital signal processing sections 143, the sections 141, 142, and 143 being arranged on an N-th basis. The optical waveform controller 80 subjects WDM signal light beams to waveform control in a collective manner, and outputs them to the demultiplexing section 151.

The demultiplexing section 151 demultiplexes the WDM signal light beams outputted from the optical waveform controller 80 for each wavelength ($\lambda_1$ to $\lambda_N$). The demultiplexing section 151 outputs the N demultiplexed signal light beams to the opto/electric conversion sections 141-1 to 141-N. The opto/electric conversion sections 141-1 to 141-N convert the respective signal light beams outputted from the demultiplexing section 151 into electrical signals and outputs them to the digital conversion sections 142-1 to 142-N.

The digital conversion sections 142-1 to 142-N convert the respective electric signals outputted from the opto/electric conversion section 141-1 to 141-N into digital signals and output them to the digital signal processing section 143-1 to 143-N. The digital signal processing section 143-1 to 143-N perform digital signal processing with respect to the respective digital signals outputted from the digital conversion section 142-1 to 142-N.

The configuration has been described in which the WDM signal light beams outputted from the optical waveform controller 80 are demultiplexed for each wavelength to thereby individually perform signal processing. However, a configuration may also be used in which digital signal processing is performed with respect to WDM signal light beams in a collective manner without demultiplexing the WDM signal light beams for each wavelength.

In this manner, according to the optical waveform controller 140 in the eighth embodiment, the above-described effects of the optical waveform controller 10 according to the first embodiment are produced, and in addition, by applying digital signal processing with respect to the signal light that has been subjected to waveform control by the optical waveform controller 10, it is possible to enhance the accuracy of the digital signal processing and to enlarge the margin of the optical communications system.

For example, by further applying waveform-reshaping or the suppression of amplitude noises by the digital signal processing section 143 to the signal light that has been subjected to waveform control by the optical waveform controller 10, waveform control with higher accuracy can be performed. This allows a reduction in the number of optical amplifiers 164 between communications devices. Also, since ASE noises caused by the optical amplifiers 164 can be suppressed, the number of the optical amplifiers can be increased to thereby elongate the distance L (refer to FIGS. 16 and 17) between communications devices.

In the above-described embodiments, the pump light generator 13 included in each of the optical waveform controllers 10, 70, 80, 90, 100, 110, and 120 has been described as generating an optical pulse train having a pulse frequency higher than the modulation frequency of signal light inputted into the signal light input port 11. However, the configuration of the pump light generator 13 included in each of these optical waveform controllers applied to the optical signal processor 140 is not limited to the above-described configuration.

For example, the pump light generator 13 included in the optical waveform controller applied to the optical signal processor 140 may be configured to generate an optical pulse train, as pump light, having the same pulse frequency as the modulation frequency of signal light inputted into the signal light input port 11. In this case, the signal light and the pump light can be synchronized with each other by detecting the timing of the signal light by the clock generating circuit or the like, and outputting the pump light in conformance with the timing of the signal light.

The pump light generator 13 may also be configured to generate CW light as pump light. In this case, the signal light and the pump light can be synchronized with each other without the need to conform the output timing of the pump light to that of the signal light. This eliminates the need to provide the clock generating circuit for detecting the timing of the signal light.

In this way, even though the pump light generator 13 is not configured to generate an optical pulse train, as pump light, having a pulse frequency higher than the modulation frequency of signal light, according to the optical signal processor 140 in the eighth embodiment, it is possible to enhance the accuracy of the digital signal processing and to enlarge the margin of the optical communications system by applying digital signal processing to the signal light that has been subjected to waveform control by the optical waveform controller 10.

Ninth Embodiment

Figure 16:
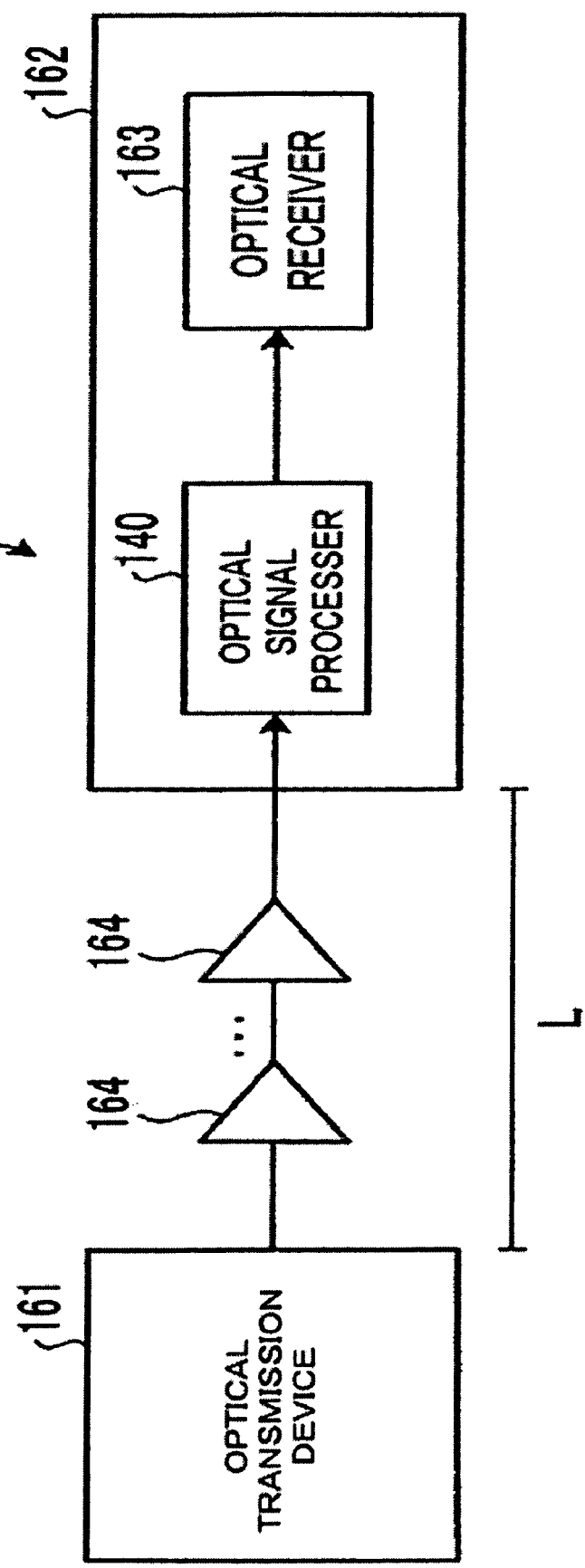
FIG. 16 is a block diagram showing the configuration of an optical communications system according to a ninth embodiment.

FIG. 16 is a block diagram showing the configuration of an optical communications system according to a ninth embodiment. In FIG. 16, the same components as those shown in FIG. 14 or 15 are designated by the same symbols, and description thereof is omitted. As shown in FIG. 16, the optical communications system 160 according to the ninth embodiment includes an optical transmission device 161 and an optical reception device 162.

The optical transmitting device 161 transmits signal light modulated by optical intensity modulation, optical phase modulation, or optical frequency modulation, to the optical receiver 162 via the transmission path. On the transmission path, optical amplification relay transmission is performed using an optical amplifier 164 as required. The optical transmitting device 161 may also be configured to transmit WDM signal light as signal light. The optical reception device 162 includes an optical signal processor 140 and an optical receiver 163.

The optical signal processor 140 subjects signal light transmitted from the optical transmission device 161 to waveform control and then to digital signal processing. The optical signal processor 140 outputs the digital signal that has been subjected to the digital signal processing, to the optical receiver 163. The optical receiver 163 receives the digital signal outputted from the optical signal processor 140 and demodulates it.

Figure 17:
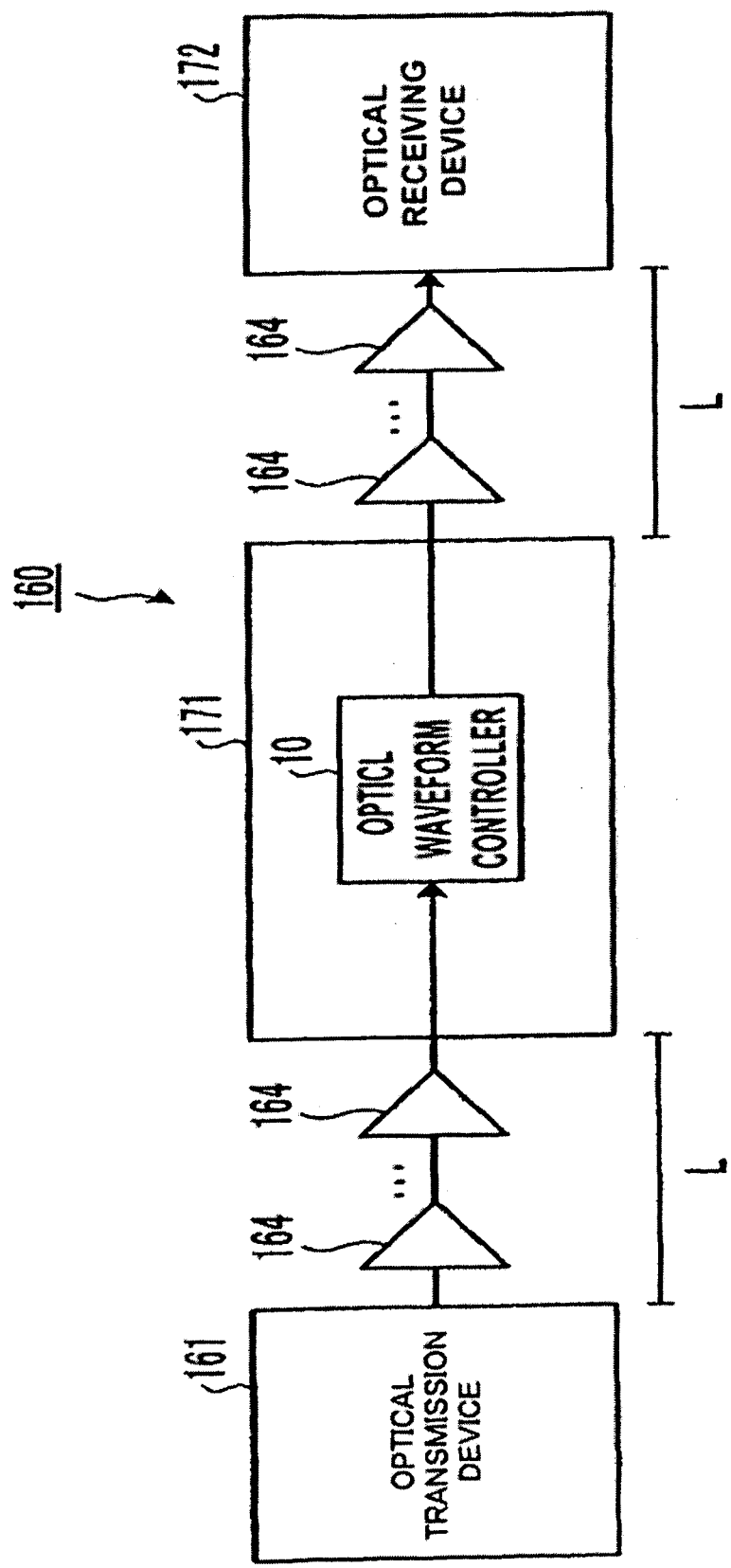
FIG. 17 is a block diagram showing a first modification of the configuration of the optical communications system according to the ninth embodiment.

FIG. 17 is a block diagram showing a first modification of the configuration of the optical communications system according to the ninth embodiment. In FIG. 17, the same components as those shown in FIG. 16 are designated by the same symbols, and description thereof is omitted. As shown in FIG. 17, the first modification of the optical communications system 160 according to the ninth embodiment includes the optical transmission device 161, an optical repeating device 171, and an optical receiving device 172.

The optical transmission device 161 transmits signal light to the optical repeating device 171 via the transmission path. The optical repeating device 171 is a repeating device for relaying signal light transmitted from the optical transmission device 161 to the optical receiving device 172, and constituted of the above-described optical waveform controller 10. The optical waveform controller 10 subjects the signal light transmitted from the optical transmission device 161 to waveform control, and transmits it to the optical receiving device 172.

The optical receiving device 172 receives the signal light transmitted from the optical repeating device 171 and demodulates it. In this way, when signal light having a characteristic sufficient for reception in the optical receiving device 172 is obtained only by the waveform control by the optical waveform controller 10, there is no need to apply digital signal processing, and so the optical repeating device 171 can be constituted by the optical waveform controller 10.

Figure 18:
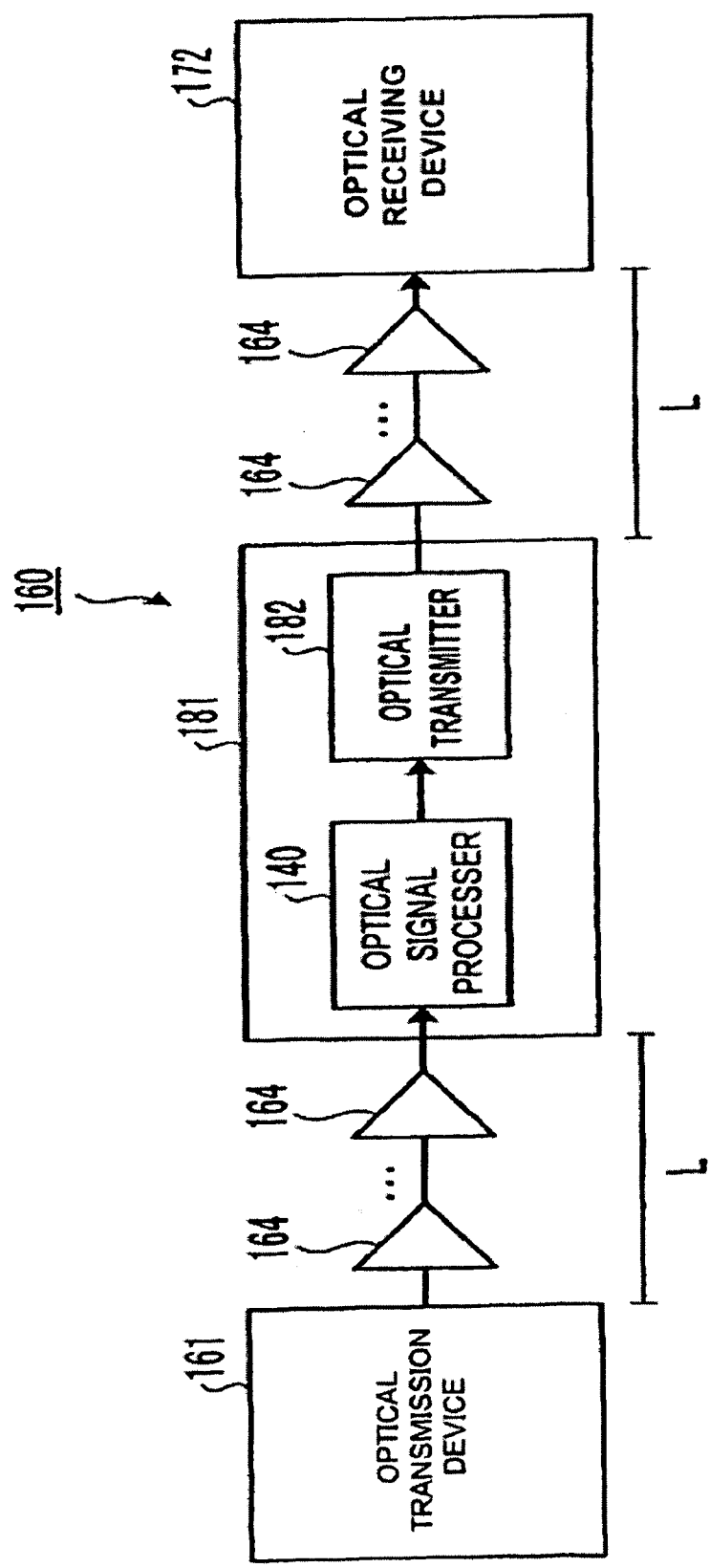
FIG. 18 is a block diagram showing a second modification of the configuration of the optical communications system according to the ninth embodiment.

FIG. 18 is a block diagram showing a second modification of the configuration of the optical communications system according to the ninth embodiment. In FIG. 18, the same components as those shown in FIG. 17 are designated by the same symbols, and description thereof is omitted. As shown in FIG. 18, the second modification of the optical communications system 160 according to the ninth embodiment includes the optical transmission device 161, an optical repeating unit 181, and the optical receiving device 172. The optical transmission device 161 transmits signal light to the optical repeating unit 181 via the transmission path.

The optical repeating unit 181 is a repeating unit for relaying signal light transmitted from the optical transmission device 161 to the optical receiving device 172, and includes the above-described optical signal processor 140 and an optical transmitter 182. The optical signal processor 140 subjects the signal light transmitted from the optical transmission device 161 to waveform control and then to digital signal processing.

The optical signal processor 140 outputs a signal that has been subjected to digital signal processing, to the optical transmitter 182. The optical transmitter 182 converts the digital signal outputted from the optical signal processor 140 into signal light, and transmits it to the optical receiving device 172. The optical receiving device 172 receives the signal transmitted from the optical repeating unit 181 and demodulates it.

In this manner, according to the optical communications system 160 in the ninth embodiment, the optical signal processor 140 according to the eighth embodiment can be applied to the optical reception device 162 or the optical repeating unit 181. Also, the optical waveform controller 10 according to the first embodiment can be applied to the optical repeating device 171. This allows an improvement in the accuracy of the digital signal processing and enlargement of the margin of the optical communications system 160.

Although the configuration in which the optical signal processor 140 is applied to the optical reception device 162 has been described, a configuration may be used in which, instead of using the optical signal processor 140, any of the optical waveform controllers 10, 70, 80, 90, 100, 110, and 120 according to the above-described embodiments is applied to the optical reception device 162. In this case, the optical receiver 163 receives signal light that is transmitted after having been subjected to waveform control by some of these optical waveform controllers.

Also, although the configuration in which the optical waveform controller 10 is applied to the optical repeating device 171 has been described, a configuration may be used in which, instead of using the optical waveform controller 10, any of the optical waveform controllers 70, 80, 90, 100, 110 and 120 according to the above-described embodiments is applied to the optical repeating device 171. In this case, the optical receiving device 172 receives signal light that is transmitted after having been subjected to waveform control by some of these optical waveform controllers.

As described above, according to the optical waveform controller, the optical signal processor, and the optical repeater according to the embodiments, by saturating the gain of signal light based on the nonlinear optical effect, it is possible to provide a linear gain to attenuated signal light to thereby restore the optical S/N ratio of the signal light, and to suppress intensity noises contained in the signal light to thereby waveform-reshape the signal light.

Also, according to the optical waveform controller, the optical signal processor, and the optical repeater according to the embodiments, by performing digital signal processing with respect to the signal light that has been subjected to waveform control by the optical waveform controller 10, it is possible to improve the accuracy of the digital signal processing and to increase the margin of the optical communications system. This allows high-rate signal light such as 40 Gb/s or 160 Gb/s to be transmitted over a long distance.

Moreover, according to the optical waveform controller, the optical signal processor, and the optical repeater according to the embodiments, by outputting pump light having a pulse frequency higher than the modulation frequency of signal light, the signal light and the pump light can be synchronizes without the need to provide the clock regenerating circuit. This allows the downsizing, simplification, and cost reduction of the apparatus.

Furthermore, according to the optical waveform controller, the optical signal processor, and the optical repeater according to the embodiments, waveform control can be performed without the need to perform tuning with respect to the wavelength. As a result, applicable wavelengths of signal light are not limited, and hence, the embodiment can be applied to, for example, WDM signal light. Also, with respect to the WDM signal light, collective waveform control can be performed. Therefore, when the embodiment is applied to the WDM signal light, the downsizing, simplification, and cost reduction of the apparatus can be achieved.

Conclusion

As described above, the optical waveform controller, the optical signal processor, and the optical repeater according to the embodiments are useful for high-capacity long-distance optical communications, and especially suitable for optical communications by WDM.

According to the embodiments, an effect of being capable of transmitting high-rate signal light over a long distance, is produced.

What is claimed is:

1. An apparatus for controlling optical waveform, comprising:
   an input port which inputs a signal light having a modulating frequency and a signal light power;
   a pump light generator which generates a pulsed pump light having a pulsed pump light power and a frequency that is 1.5 times higher, or more, than the modulating frequency of the signal light;
   a nonlinear optical medium which transmits together the signal light from the input port and the pulsed pump light from the pump light generator, the nonlinear optical medium having a gain of the signal light based on a nonlinear optical effect; and
   a power adjustor which adjusts a relative power of the signal light power and the pulsed pump light power so that the gain of the signal light in the nonlinear optical medium decreases with an increase of the signal light power.

2. The apparatus for controlling optical waveform of claim 1, wherein the signal light is a wavelength division multiplexed signal light.

3. The apparatus for controlling optical waveform of claim 1, wherein the pump light generator multiplexes a plurality of optical pulse trains, the optical pulse trains having a width narrower than the width of the signal light.

4. The apparatus for controlling optical waveform of claim 1, wherein the signal light has a signal light polarization state; and wherein the pulsed pump light has a pulsed pump light polarization state; and
the apparatus further comprising:
a polarization adjustor which adjusts at least one of the group consisting of the signal light polarization state and the pulsed pump light polarization state so that the signal light polarization state is in a different polarization state from the pulsed pump light polarization state; and
a polarizer which cuts off the signal light outputted from the nonlinear optical medium.

5. The apparatus for controlling optical waveform of claim 4, wherein the pump light generator switches an on-state and an off-state of the pulsed pump light.

6. The apparatus for controlling optical waveform of claim 1, further comprising a filter which cuts off the pulsed pump light from the nonlinear optical medium.

7. The apparatus for controlling optical waveform of claim 1, further comprising:
a monitor which monitors the signal light transmitted through the nonlinear optical medium; and
a controller which controls the power adjustor on the basis of a result of the monitor.

8. The apparatus for controlling optical waveform of claim 1, wherein the nonlinear optical medium optical-parametric-amplifies by the pulsed pump light from the pump light generator.

9. The apparatus for controlling optical waveform of claim 1, wherein the nonlinear optical medium is an optical fiber.

10. The apparatus for controlling optical waveform of claim 1, further comprising:
an optical/electrical convertor which converts the amplified signal light from the nonlinear optical medium to an electrical signal; and
a digital signal processer which digitally processes the electrical signal.

11. The apparatus for controlling optical waveform of claim 10 further comprising:
an optical transmitter which converts a digital signal outputted from the digital signal processer into a signal light.

12. The apparatus for controlling optical waveform of claim 1, wherein the frequency of the pulsed pump light is sufficiently higher than the modulating frequency of the signal light so that the signal light and pulsed pump light synchronize with each other without adjusting output timing of the pulsed pump light in conformance with that of the signal light.

13. An optical communication system comprising:
a transmitter which transmits a signal light to a transmission line;
a repeater, arranged along the transmission line, which receives the signal light from the transmission line, repeats the received signal light, and then transmits the repeated signal light, the repeater comprising:
an input port which inputs the signal light having a modulating frequency and a signal light power;
a pump light generator which generates a pulsed pump light having a pulsed pump light power and a frequency that is 1.5 times higher, or more, than the modulating frequency of the signal light;
a nonlinear optical medium which transmits together the signal light from the input port and the pulsed pump light from the pump light generator, the nonlinear optical medium having a gain of the signal light based on a nonlinear optical effect; and
a power adjustor which adjusts a relative power of the signal light power and the pulsed pump light power so that the gain of the signal light in the nonlinear optical medium decreases with an increase of the signal light power; and
a receiver which receives the repeated signal light from the transmission line.

14. An apparatus for controlling optical waveform, comprising:
input means for inputting a signal light having a modulating frequency and a signal light power;
generation means for generating pulsed pump light having a pulsed pump light power and a frequency that is 1.5 times higher, or more, than the modulating frequency of the signal light;
nonlinear light means for transmitting together the signal light from the input means and the pulsed pump light from the generation means, the nonlinear light means having a gain of the signal light based on a nonlinear optical effect; and
power adjustment means for adjusting a relative power of the signal light power and the pulsed pump light power so that the gain of the signal light in the nonlinear light means decreases with an increase of the signal light power.

15. An apparatus for controlling optical waveform, comprising:
an input port which inputs a signal light having a modulating frequency and a signal light power;
a pump light generator which generates a pulsed pump light having a pulsed pump light power and a frequency higher than the modulating frequency of the signal light;
a nonlinear optical medium which transmits together the signal light from the input port and the pulsed pump light from the pump light generator, the nonlinear optical medium having a gain of the signal light based on a nonlinear optical effect; and
a power adjustor which adjusts at least one of the group consisting of the signal light power and the pulsed pump light power in order to saturate the gain of the signal light in the nonlinear optical medium, wherein
the signal light has a signal light polarization state, and the pulsed pump light has a pulsed pump light polarization state, and
the apparatus further comprising:
a polarization adjustor which adjusts at least one of the group consisting of the signal light polarization state and the pulsed pump light polarization state so that the signal light polarization state is in a different polarization state from the pulsed pump light polarization state, and
a polarizer which cuts off the signal light outputted from the nonlinear optical medium.

16. The apparatus for controlling optical waveform of claim 15, wherein the pump light generator switches an on-state and an off-state of the pulsed pump light.

17. An apparatus comprising:

an input port which inputs a signal light having a modulating frequency and a signal light power;

a pump light generator which generates pulsed pump light having a pulsed pump light power and a frequency higher than the modulating frequency of the signal light;

a nonlinear optical medium which transmits together the signal light from the input port and the pulsed pump light from the pump light generator, the nonlinear optical medium having a gain of the signal light based on a nonlinear optical effect; and a power adjustor which adjusts a relative power of the signal light power and the pulsed pump light power so that the gain of the signal light in the nonlinear optical medium decreases with an increase of the signal light power, wherein the frequency of the pulsed pump light is sufficiently higher than the modulating frequency of the signal light so that the signal light and pulsed pump light synchronize with each other without adjusting output timing of the pulsed pump light in conformance with that of the signal light.

* * * * *